(12) United States Patent
Cheon et al.

(10) Patent No.: US 9,628,812 B2
(45) Date of Patent: Apr. 18, 2017

(54) METHOD AND APPARATUS FOR ENCODING AND DECODING VIDEO BY USING PATTERN INFORMATION IN HIERARCHICAL DATA UNIT

(71) Applicant: SAMSUNG ELECTRONICS CO., LTD., Suwon-si (KR)

(72) Inventors: Min-su Cheon, Suwon-si (KR); Jung-hye Min, Suwon-si (KR); Hae-kyung Jung, Seoul (KR); Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 157 days.

(21) Appl. No.: 14/704,019

(22) Filed: May 5, 2015

(65) Prior Publication Data

US 2015/0237361 A1 Aug. 20, 2015

Related U.S. Application Data

(63) Continuation of application No. 13/005,880, filed on Jan. 13, 2011, now abandoned.

(30) Foreign Application Priority Data

Jan. 14, 2010 (KR) .................. 10-2010-0003557

(51) Int. Cl.
*H04N 19/44* (2014.01)
*H04N 19/46* (2014.01)
*H04N 19/60* (2014.01)

(52) U.S. Cl.
CPC ............. *H04N 19/44* (2014.11); *H04N 19/46* (2014.11); *H04N 19/60* (2014.11)

(58) Field of Classification Search
CPC ......... H04N 19/44; H04N 19/46; H04N 19/60
See application file for complete search history.

(56) References Cited

U.S. PATENT DOCUMENTS

| 8,422,803 | B2 | 4/2013 | Sekiguchi et al. |
| 9,148,665 | B2 | 9/2015 | Cheon et al. |
| (Continued) | | | |

FOREIGN PATENT DOCUMENTS

| CN | 1857001 A | 11/2006 |
| CN | 1972449 A | 5/2007 |
| (Continued) | | |

OTHER PUBLICATIONS

Communication issued on Sep. 14, 2015 by the European Patent Office in related Application No. 15165155.1.

(Continued)

*Primary Examiner* — Neil Mikeska
(74) *Attorney, Agent, or Firm* — Sughrue Mion, PLLC

(57) ABSTRACT

A video decoding apparatus including an extractor which extracts from a bitstream first pattern information indicating whether residual samples of a current coding unit are equal to 0, and when the first pattern information indicates the residual samples are not equal to 0, extracts from the bitstream transformation index information indicating whether a transformation unit of a current level included in the current coding unit is split, a decoder which splits the transformation unit of the current level into transformation units of a lower level when the transformation index information indicates a split of the transformation unit of the current level, wherein the extractor further extracts second pattern information for the transformation unit of the current level when the transformation index information indicates a non-split of the transformation unit of the current level, wherein the second pattern information indicates whether (Continued)

the transformation unit of the current level contains one or more transform coefficients not equal to 0.

4 Claims, 21 Drawing Sheets

(56) References Cited

U.S. PATENT DOCUMENTS

| | | | |
|---|---|---|---|
| 9,313,489 B2 | 4/2016 | Chen et al. | |
| 9,426,496 B2* | 8/2016 | Kim | H04N 19/18 |
| 2004/0141656 A1* | 7/2004 | Irvine | G06T 9/005 |
| | | | 382/240 |
| 2004/0208392 A1* | 10/2004 | Raveendran | G06T 5/002 |
| | | | 382/268 |
| 2005/0053151 A1* | 3/2005 | Lin | H04N 19/52 |
| | | | 375/240.23 |
| 2005/0114093 A1 | 5/2005 | Cha et al. | |
| 2006/0251330 A1 | 11/2006 | Toth et al. | |
| 2008/0049834 A1* | 2/2008 | Holcomb | H04N 19/136 |
| | | | 375/240.2 |
| 2009/0087109 A1* | 4/2009 | Li | H04N 19/13 |
| | | | 382/238 |
| 2009/0273491 A1* | 11/2009 | Sakaguchi | H03M 7/4006 |
| | | | 341/51 |
| 2009/0279797 A1* | 11/2009 | Choi | H04N 19/91 |
| | | | 382/233 |
| 2010/0086030 A1* | 4/2010 | Chen | H04N 19/176 |
| | | | 375/240.12 |
| 2010/0086031 A1 | 4/2010 | Chen et al. | |
| 2010/0086032 A1* | 4/2010 | Chen | H04N 19/176 |
| | | | 375/240.12 |
| 2011/0002554 A1* | 1/2011 | Uslubas | H04N 19/176 |
| | | | 382/238 |
| 2011/0090967 A1 | 4/2011 | Chen et al. | |
| 2012/0163469 A1* | 6/2012 | Kim | H04N 19/176 |
| | | | 375/240.18 |
| 2012/0177116 A1* | 7/2012 | Panusopone | H04N 19/159 |
| | | | 375/240.12 |
| 2013/0003855 A1 | 1/2013 | Park et al. | |
| 2015/0326879 A1 | 11/2015 | Alshina et al. | |

FOREIGN PATENT DOCUMENTS

| | | |
|---|---|---|
| JP | 2008172599 A | 7/2008 |
| JP | 2013-502143 A | 1/2013 |
| JP | 2013-502144 A | 1/2013 |
| KR | 10-2005-0045746 A | 5/2005 |
| KR | 10-2006-0027795 A | 3/2006 |
| KR | 10-0842558 B1 | 6/2008 |
| KR | 10-2011-0017721 A | 2/2011 |
| WO | 2009/001864 A1 | 12/2008 |
| WO | 2009/151232 A2 | 12/2009 |
| WO | 2010/002214 A2 | 1/2010 |
| WO | 2010/039733 A2 | 4/2010 |
| WO | 2011/019249 A2 | 2/2011 |

OTHER PUBLICATIONS

Communication issued on Sep. 14, 2015 by the European Patent Office in related Application No. 15165156.9.
Communication issued on Sep. 15, 2015 by the Japanese Patent Office in related Application No. 2012-548888.
Communication issued on Dec. 3, 2015 by the European Patent Office in related Application No. 11733082.9.
"Video Coding Using Extended Block Sizes", International Telecommunication Union, Telecommunication Standardization Sector, Study Group 16-Contribution 123, Jan. 2009, 4 total pages.
Wiegand et al., "Draft ITU-T Recommendation and Final Draft International Standard of Joint Video Specification (ITU-T Rec. H.264 ISO/IEC 14496-10 AVC)", Joint Video Team (JVT) of ISO/IEC MPEG & ITU-T VCG, 8th Meeting, May 23-27, 2003, 269 total pages.
Chen et al., "Video Coding Using Extended Block Sizes", ITU-Telecommunications Standardization Sector, 36th Meeting, Oct. 8-10, 2008, 3 total pages.
"Advanced video coding for generic audiovisual services", International Telecommunication Union, Telecommunication Standardization Sector of ITU, No. H.264, Mar. 1, 2005, 341 total pages.
Communication dated Feb. 2, 2016 issued by Japanese Intellectual Property Office in counterpart Japanese Application No. 2015-087007.
Communication dated Feb. 2, 2016 issued by Japanese Intellectual Property Office in counterpart Japanese Application No. 2015-087008.
International Search Report (PCT/ISA/210) and Written Opinion (PCT/ISA/237) issued by the International Searching Authority in corresponding International Application No. PCT/KR2011/000242 on Sep. 15, 2011.
Communication dated Oct. 20, 2014, issued by the State Intellectual Property Office of P.R. China in counterpart Chinese Application No. 201180014000.1.
Communication dated Oct. 21, 2014, Issued by the Japanese Intellectual Property Office in counterpart Japanese Application No. 2012-548888.
Jaeil Kim et al., Enlarging MB size for high fidelity video coding beyond HD, ITU—Telecommunications Standardization Sector Study Group 16 Question 6 Video Coding Experts Group VCEG-AJ21, ST, Oct. 2008, URL http://wftp3.itu.int/av-arch/video-site/0810_San/VCEG-AJ21.zip.

* cited by examiner

FIG. 7
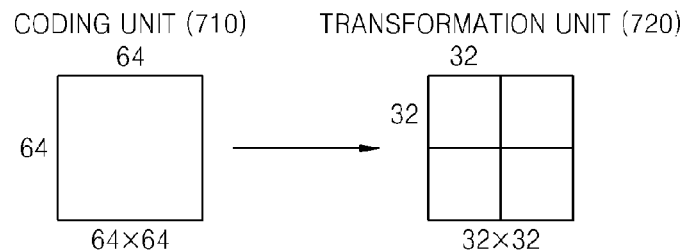
FIG. 8
'PARTITION TYPE'-INFORMATION (800)
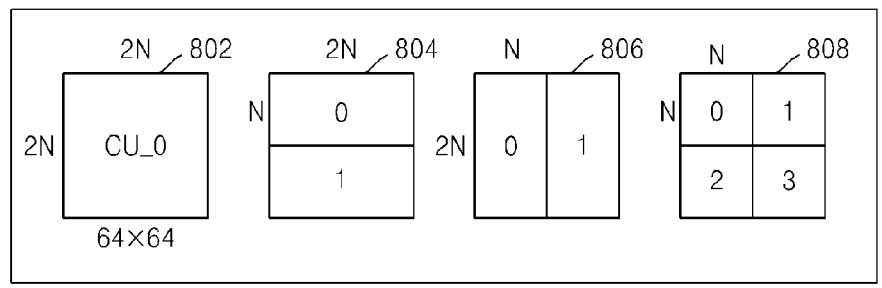
'PREDICTION MODE'-INFORMATION (810)
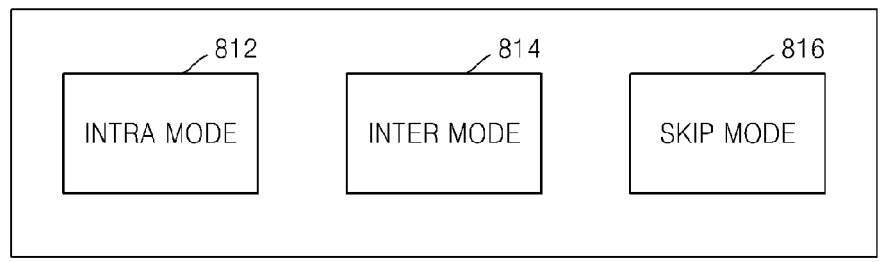
'SIZE OF TRANSFORMATION UNIT'-INFORMATION (820)
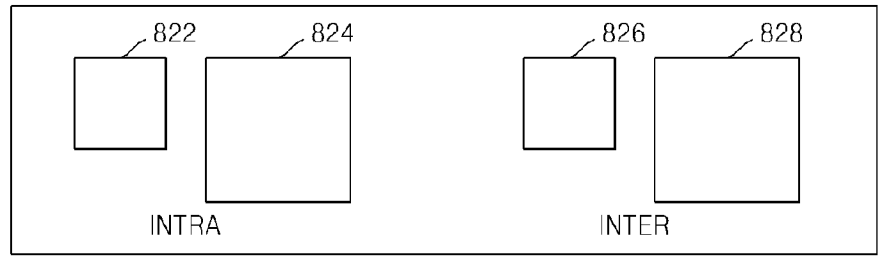

CODING UNITS (1010)

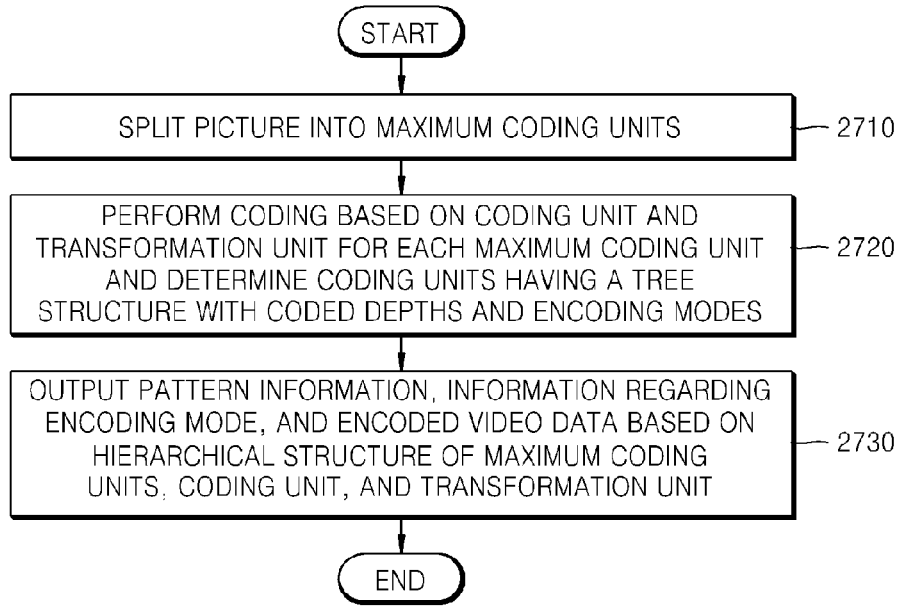
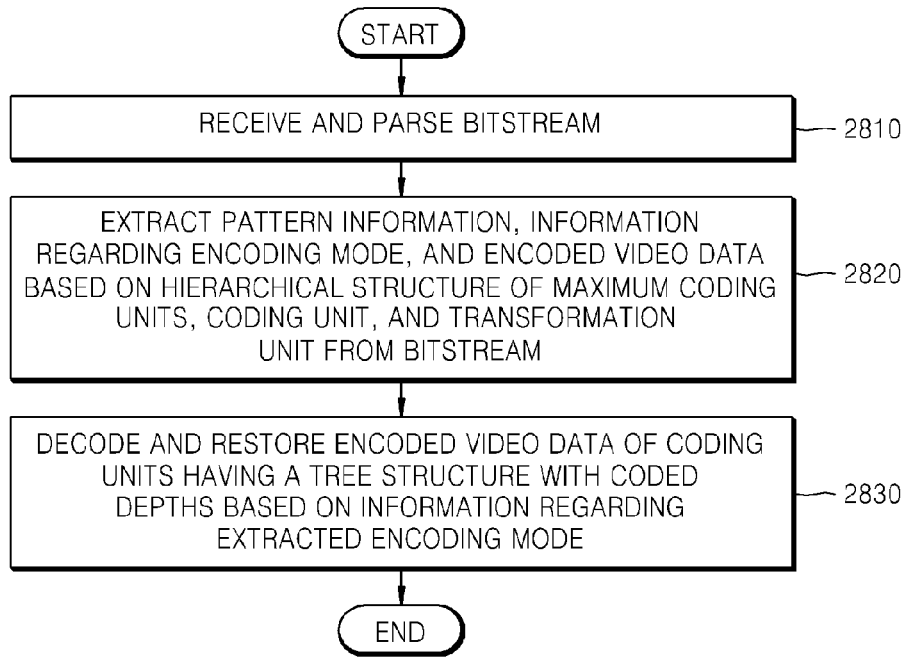

METHOD AND APPARATUS FOR ENCODING AND DECODING VIDEO BY USING PATTERN INFORMATION IN HIERARCHICAL DATA UNIT

CROSS-REFERENCE TO RELATED PATENT APPLICATION

This application is a Continuation Application of U.S. application Ser. No. 13/005,880, filed on Jan. 13, 2011, in the United States Patent and Trademark Office, which claims priority from Korean Patent Application No. 10-2010-0003557, filed on Jan. 14, 2010, in the Korean Intellectual Property Office, the disclosures of which are incorporated herein by reference in their entireties.

BACKGROUND

1. Field

The exemplary embodiments relate to encoding and decoding a video.

2. Description of the Related Art

As hardware for reproducing and storing high resolution or high quality video content is being developed, there is an increasing need for a video codec for effectively encoding or decoding the high resolution or high quality video content. In a conventional video codec, a video is encoded according to a limited encoding method based on a macroblock having a predetermined size.

In the video codec, coded block pattern is used to represent whether transformation coefficients of a block are transmitted. Texture of the block relates to whether the block includes a transformation coefficient that is not 0. Thus, coded block pattern represents characteristic regarding texture of the block.

SUMMARY

The exemplary embodiments provide encoding and decoding of video by using pattern information that is set and read in a coding unit and in a data unit of a hierarchical structure.

According to an exemplary embodiment, method of encoding video using pattern information of a hierarchical data unit includes splitting a picture into at least one maximum coding unit that is an encoding data unit having a maximum size in which the picture is encoded, the maximum coding unit comprising coding units smaller than the maximum coding unit that are data units in which the picture is encoded, encoding and transforming the coding units into transformation units according to depths of the coding units that indicate a number of times the maximum coding unit is split to obtain the coding units, determining a coded depth at which a least encoding error of encoding the picture occurs, determining coding units of the determined coded depth, determining an encoding mode with respect to each coding unit of the determined coded depth including information regarding a size of the transformation units corresponding to the determined coding units, and outputting pattern information indicating whether texture related information is encoded based on a hierarchical structure of the at least one maximum coding unit, the determined coding units, and the transformation units corresponding to the determined coding units according to the determined encoding mode, information regarding the determined encoding mode, and information regarding a maximum size of the determined coding units, wherein the picture is hierarchically split into the at least one maximum coding unit and the coding units according to the depths, and the coding units are independently split according to the depths.

The pattern information may include hierarchical coding unit pattern information indicating whether texture related information and coding unit pattern information of a transformation unit of a lower transformation depth are encoded, hierarchically from the coding units of the coded depths of the maximum coding units to at least one transformation unit.

The pattern information may further include maximum coding unit pattern information indicating whether texture related information of the maximum coding units is encoded.

When the maximum coding unit pattern information is set to encode the texture related information of the maximum coding unit, the hierarchical coding unit pattern information for the coding units of the coded depths of the maximum coding units is set.

The hierarchical coding unit pattern information may bet set until each coding units arrives at a transformation unit of the transformation depth, from among coding units of the coded depths of the maximum coding units.

According to another aspect of an exemplary embodiment, a method of decoding video using pattern information of a hierarchical data unit includes receiving and parsing a bitstream of an encoded picture, extracting information regarding a maximum size of coding units that are data units in which the picture is encoded, information regarding an encoding mode with respect to a coding unit among the coding units of a coded depth, and pattern information that indicates whether texture related information is encoded based on a hierarchical structure of at least one maximum coding unit that is an encoding data unit having a maximum size in which the picture is encoded, coding units among the coding units of coded depths, and transformation units corresponding to the coding units, from the parsed bitstream, and extracting video data encoded for the at least one maximum coding unit from the parsed bitstream, based on the information regarding the encoding mode and the pattern information; and decoding the video data encoded for the coding units of the coded depths and the transformation units, based on the information about the maximum size of coding units and the information regarding the encoding mode, wherein the picture is hierarchically split into the at least one maximum coding unit and the coding units according to the depths, and the coding units are independently split according to the coded depths.

The extracting may include: determining whether to extract texture related information and coding unit pattern information of a transformation unit of a lower transformation depth based on the hierarchical coding unit pattern information, hierarchically from the coding units of the coded depths of the maximum coding units to at least one transformation unit.

The extracting may further include: determining whether to extract texture related information of the maximum coding units based on the maximum coding unit pattern information.

The extracting may further include: determining whether to extract hierarchical coding unit pattern information of coded depths of the maximum coding units, based on the maximum coding unit pattern information.

According to another aspect of an exemplary embodiment, there is provided a video encoding apparatus using pattern information of a hierarchical data unit including: a maximum coding unit splitter that splits a picture into at least one maximum coding unit that is an encoding data unit having a maximum size in which the picture is encoded, the maximum coding unit comprising coding units smaller than the maximum coding unit that are data units in which the picture is encoded; a coding unit and encoding mode determiner that encodes and transforms the coding units into transformation units according to depths of the coding units that indicate a number of times the maximum coding unit is split to obtain the coding units, determines a coded depth at which a least encoding error of encoding the picture occurs, determines coding units of the determined coded depth, and determines an encoding mode with respect to each coding unit of the determined coded depth including information regarding a size of the transformation units corresponding to the determined coding units; and an output unit that outputs pattern information that indicates whether texture related information is encoded based on a hierarchical structure of the at least one maximum coding unit, the determined coding units, and the transformation units corresponding to the determined coding units according to the determined encoding mode, information regarding the determined encoding mode, and information regarding a maximum size of the determined coding units, wherein the picture is hierarchically split into the at least one maximum coding unit and the coding units according to the depths, and the coding units are independently split according to the depths.

According to another aspect of an exemplary embodiment, there is provided a video decoding apparatus using pattern information of a hierarchical data unit including: a receiver that receives and parses a bitstream of an encoded picture; a data extractor that extracts information regarding a maximum size of coding units that are data units in which the picture is encoded, information regarding an encoding mode with respect to a coding unit among the coding units of a coded depth, and pattern information that indicates whether texture related information is encoded based on a hierarchical structure of the at least one maximum coding unit that is an encoding data unit having a maximum size in which the picture is encoded, coding units among the coding units of coded depths, and transformation units corresponding to the coding units, from the parsed bitstream, and extracting video data encoded for the at least one maximum coding unit from the parsed bitstream, based on the information regarding the encoding mode and the pattern information; and a decoder that decodes the video data encoded for the coding units of the coded depths and the transformation units, based on the information regarding the maximum size of coding units and the information regarding the encoding mode, wherein the picture is hierarchically split into the at least one maximum coding unit and the coding units according to the depths, and the coding units are independently split according to the coded depths.

According to another aspect of an exemplary embodiment, there is provided a computer readable recording medium having recorded thereon a program for executing a video encoding method using pattern information of a hierarchical data unit.

According to another aspect of an exemplary embodiment, there is provided a computer readable recording medium having recorded thereon a program for executing a video encoding method using pattern information of a hierarchical data unit.

BRIEF DESCRIPTION OF THE DRAWINGS

The above and/or other features will become more apparent by describing in detail exemplary embodiments thereof with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 27 is a flowchart illustrating a video encoding method using pattern information of a hierarchical data unit, according to an exemplary embodiment; and FIG. 28 is a flowchart illustrating a video decoding method using pattern information of a hierarchical data unit, according to an exemplary embodiment.

DETAILED DESCRIPTION OF THE EXEMPLARY EMBODIMENTS

Hereinafter, the exemplary embodiments will be described more fully with reference to the accompanying drawings, in which the exemplary embodiments are shown. As used throughout the specification, the term "unit" may or may not refer to a unit of size, depending on its context.

Hereinafter, a 'coding unit' is an encoding data unit in which the image data is encoded at an encoder side, for example an encoding apparatus including a processor and an encoder, and an encoded data unit in which the encoded image data is decoded at a decoder side, for example a decoding apparatus including a processor and a decoder, according to the exemplary embodiments. Also, a 'coded depth' means a depth at which a coding unit is encoded.

Hereinafter, an 'image' may denote a still image for a video or a moving image, that is, the video itself.

Encoding and decoding of video based on a spatially hierarchical data unit according to an exemplary embodiment will be described with reference to FIGS. 1 through 15, and encoding and decoding of video by using pattern information of a hierarchical data unit according to an exemplary embodiment will be described with reference to FIGS. 16 through 28.

Figure 1:
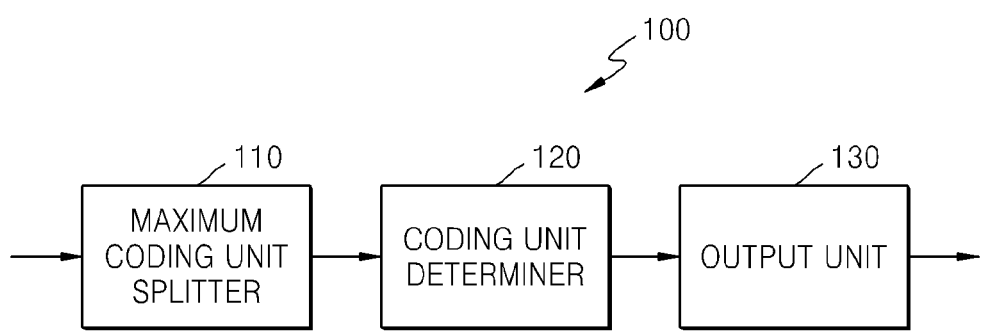
FIG. 1 is a block diagram of an apparatus for encoding a video, according to an exemplary embodiment.

FIG. 1 is a block diagram of a video encoding apparatus 100, according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selects a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be split according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times image data is split from a maximum coding unit to a minimum coding unit. A first maximum depth according to an exemplary embodiment may denote the total number of times the image data is split from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed. The same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1 ratios, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having fewest encoding errors.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size less than or equal to the coding unit. For example, the data unit for the transformation may include a data unit for an intra mode and a data unit for an inter mode.

A data unit used as a base of the transformation will now be referred to as a 'transformation unit'. A transformation depth indicating the number of splits to reach the transformation unit by splitting the height and width of the coding unit may also be set in the transformation unit. For example, in a current coding unit of 2N×2N, a transformation depth may be 0 when the size of a transformation unit is also 2N×2N, a transformation depth may be 1 when each of the height and width of the current coding unit is split into two equal parts, totally split into $4^1$ transformation units, and the size of the transformation unit is thus N×N, and a transformation depth may be 2 when each of the height and width of the current coding unit is split into four equal parts, totally split into $4^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be split according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having least encoding errors, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the video encoding apparatus 100, the deeper coding unit may be a coding unit obtained by splitting a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

If an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
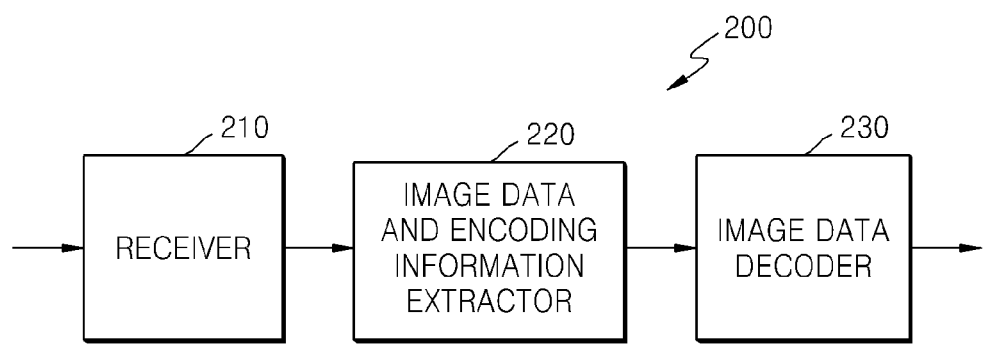
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
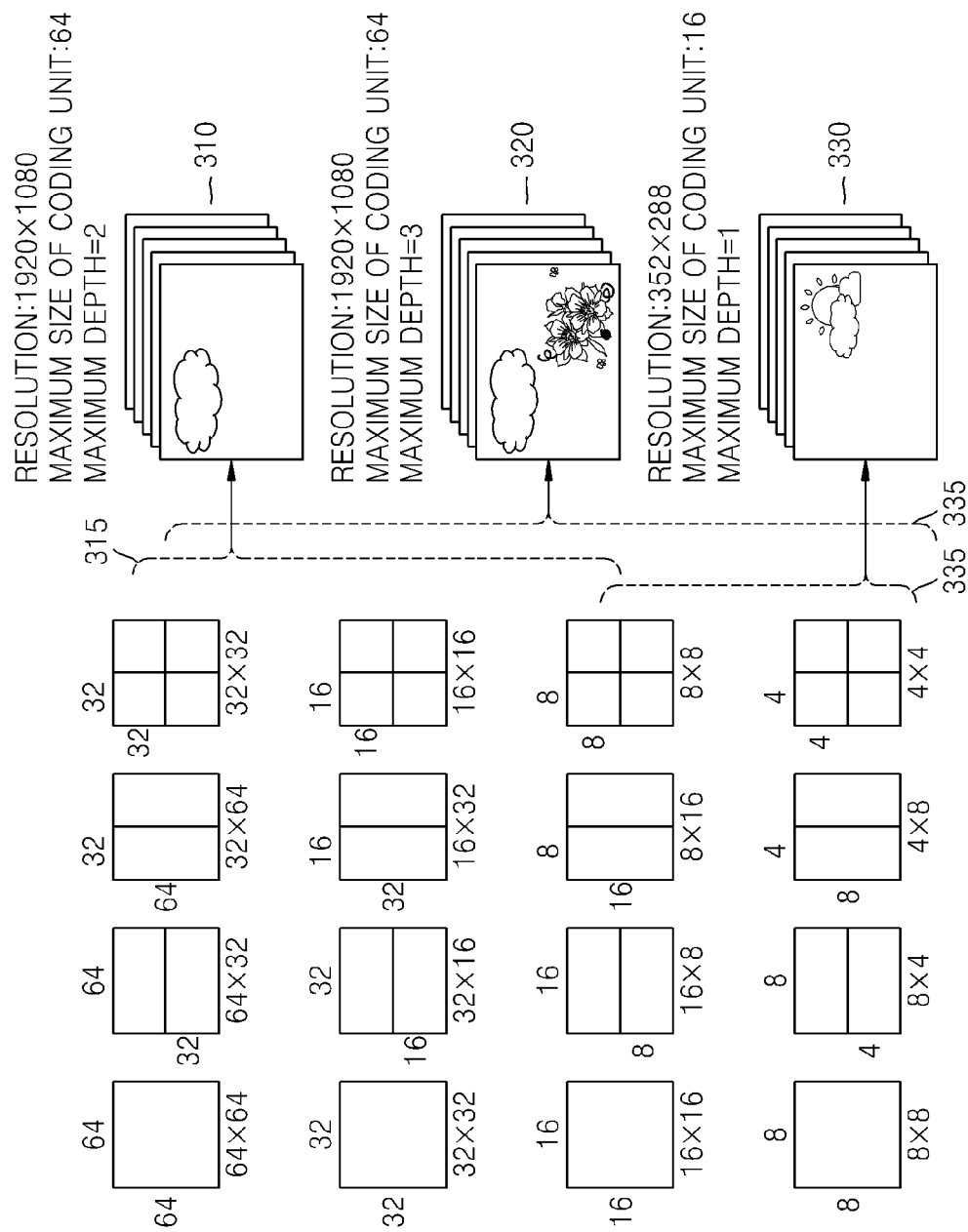
FIG. 3 is a diagram for describing a concept of coding units, according to an exemplary embodiment.

FIG. 3 is a diagram for describing a concept of coding units, according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency, but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
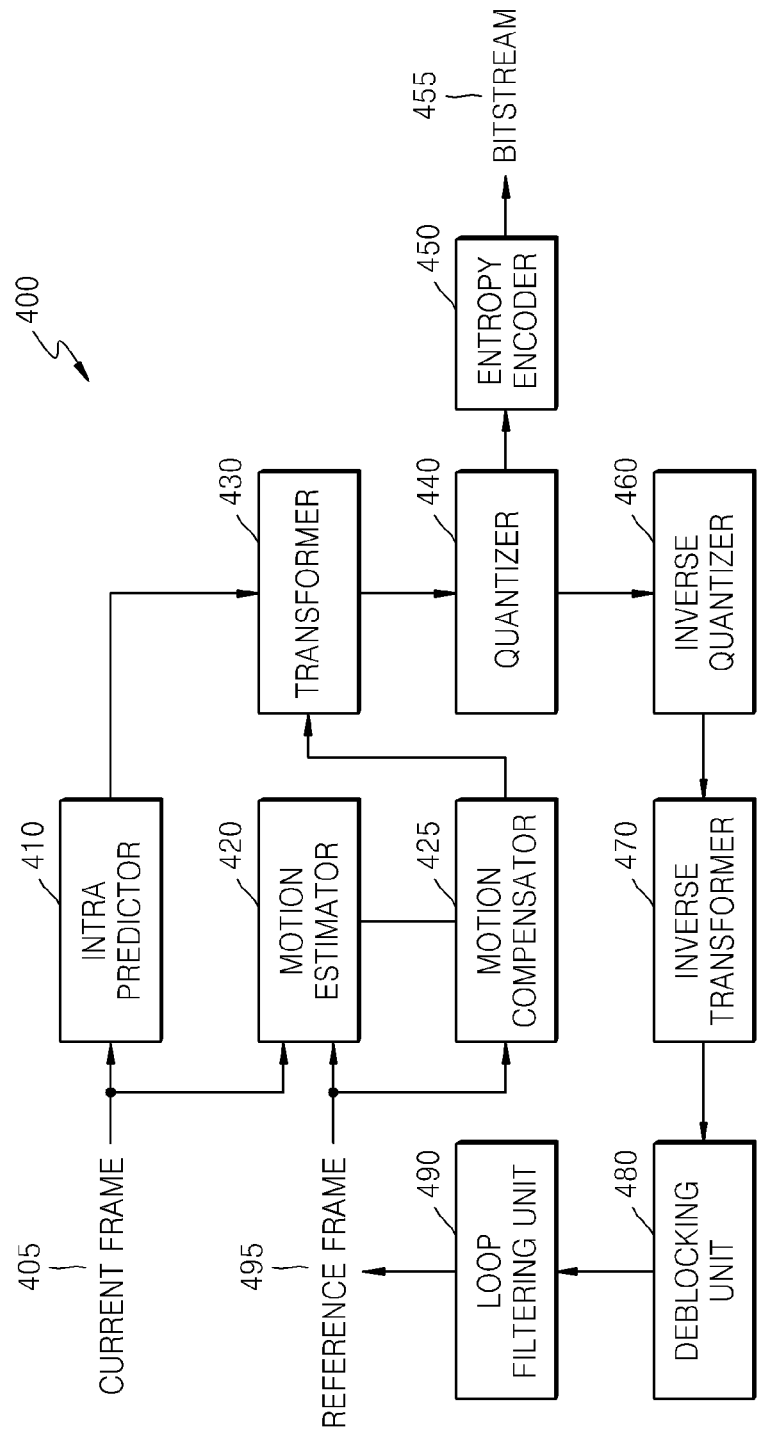
FIG. 4 is a block diagram of an image encoder based on coding units, according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
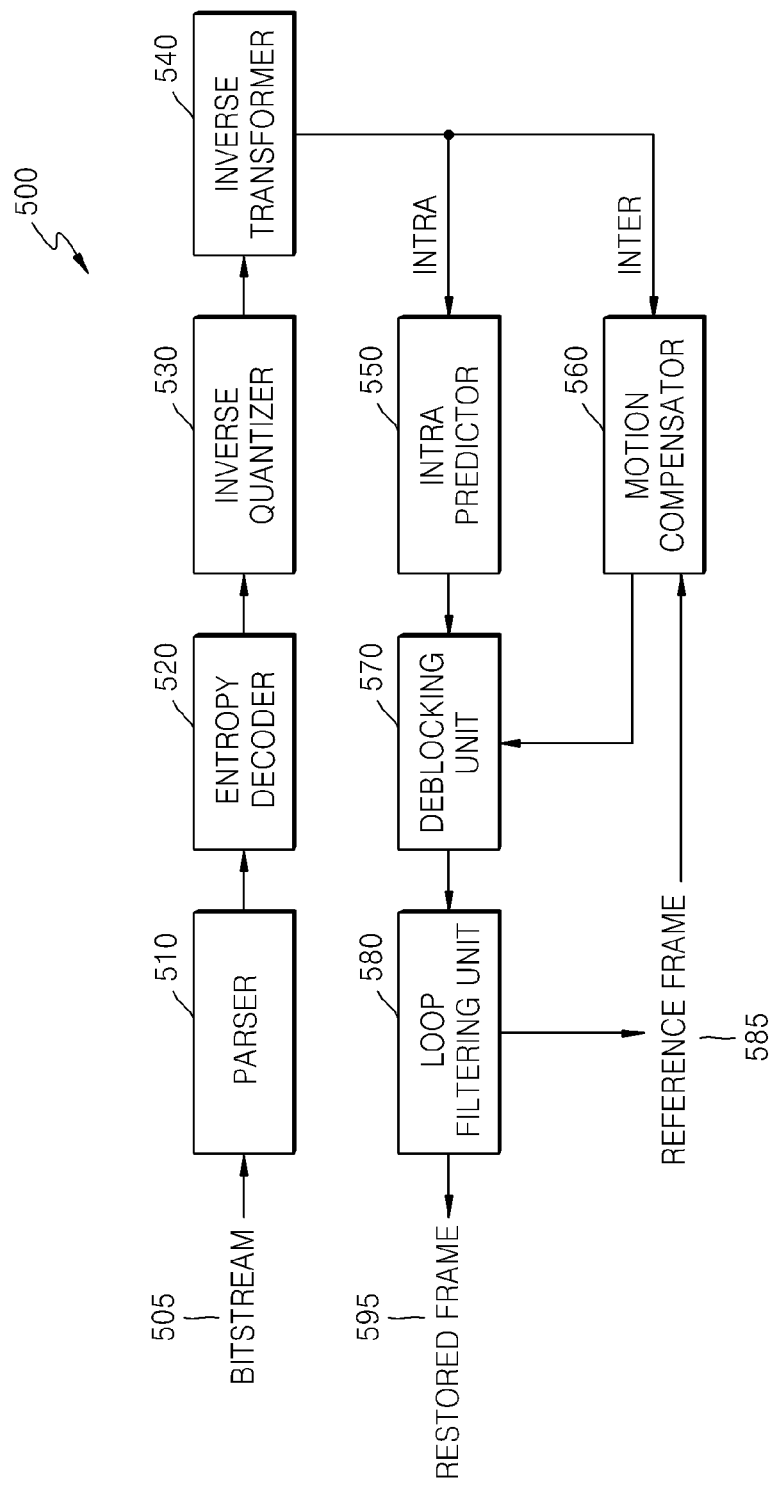
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

Figure 6:
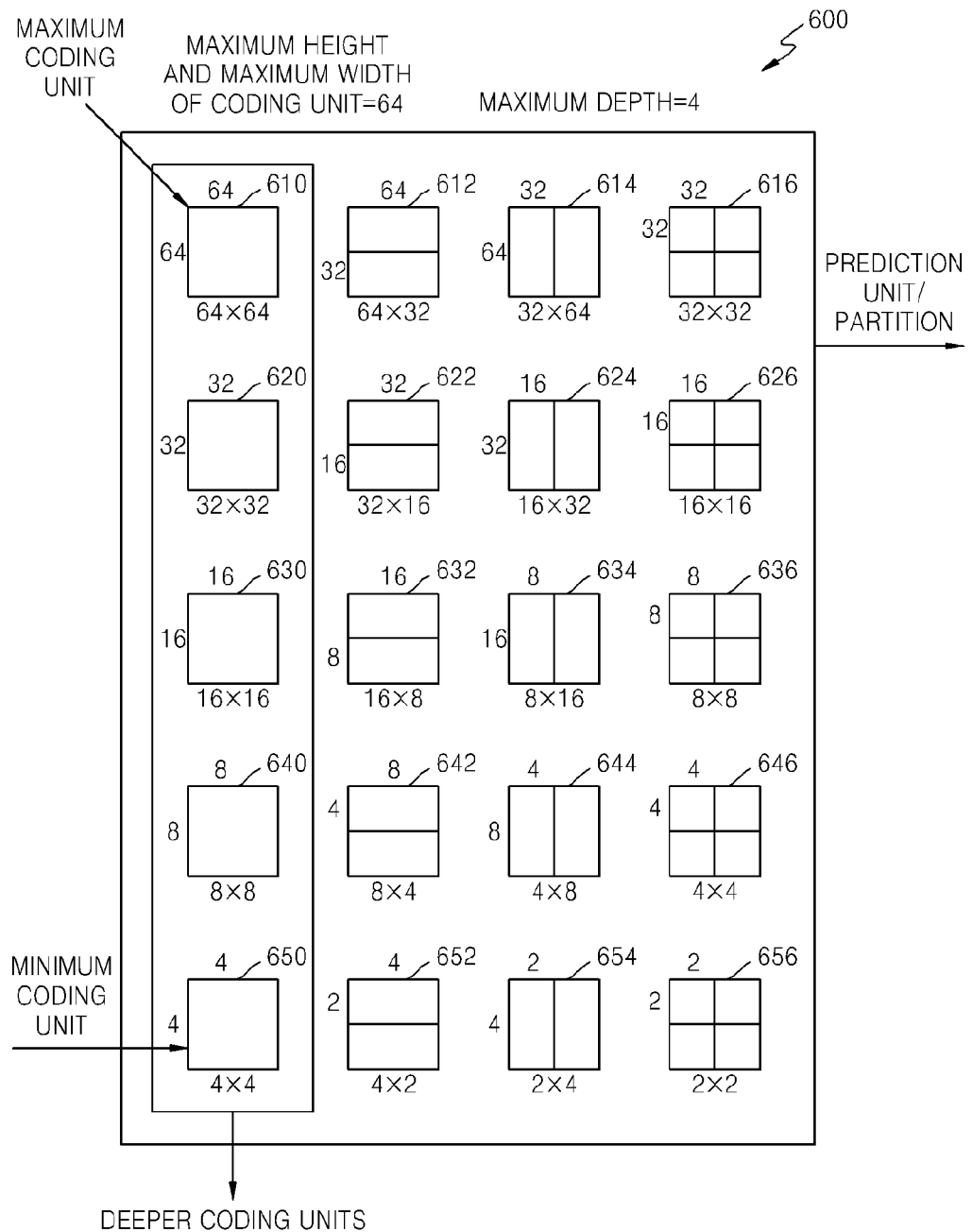
FIG. 6 is a diagram illustrating deeper coding units according to depths and partitions, according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4, as opposed to being partitioned into partitions 652 having a size of 4×2, partitions 654 having a size of 2×4, and partitions 656 having a size of 2×2.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, least encoding errors may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 9:
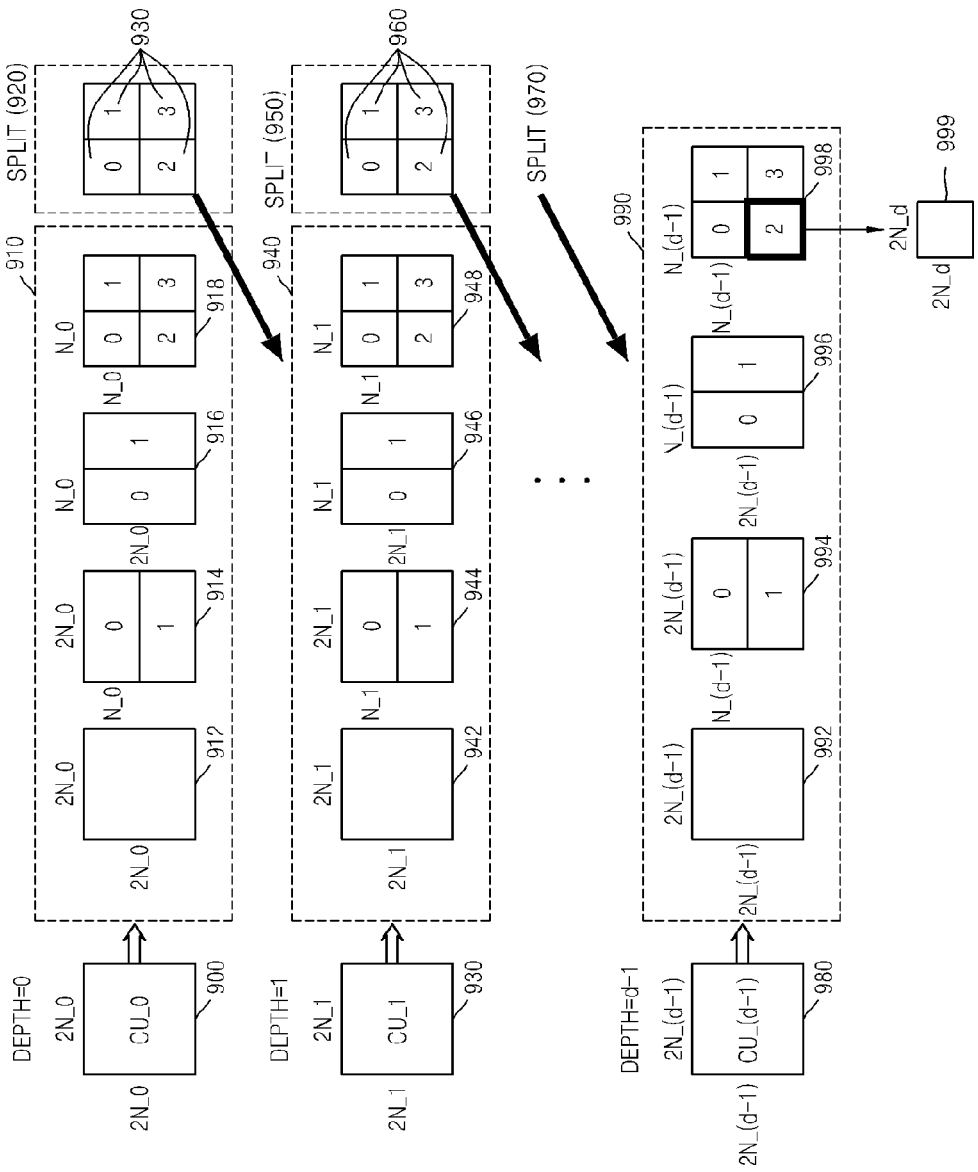
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
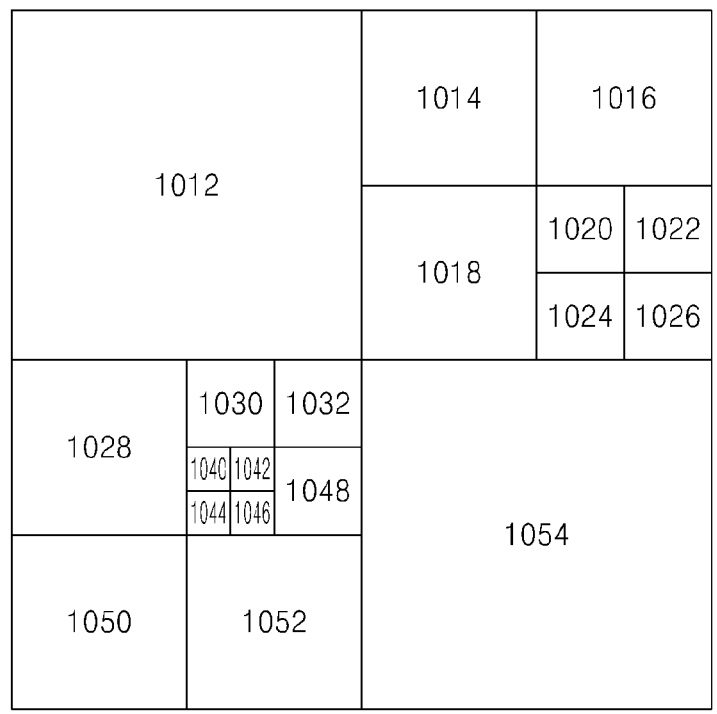
FIGS. 10, 11, and 12 are diagrams for describing a relationship between coding units, prediction units, and transformation units, according to an exemplary embodiment.
Figure 11:
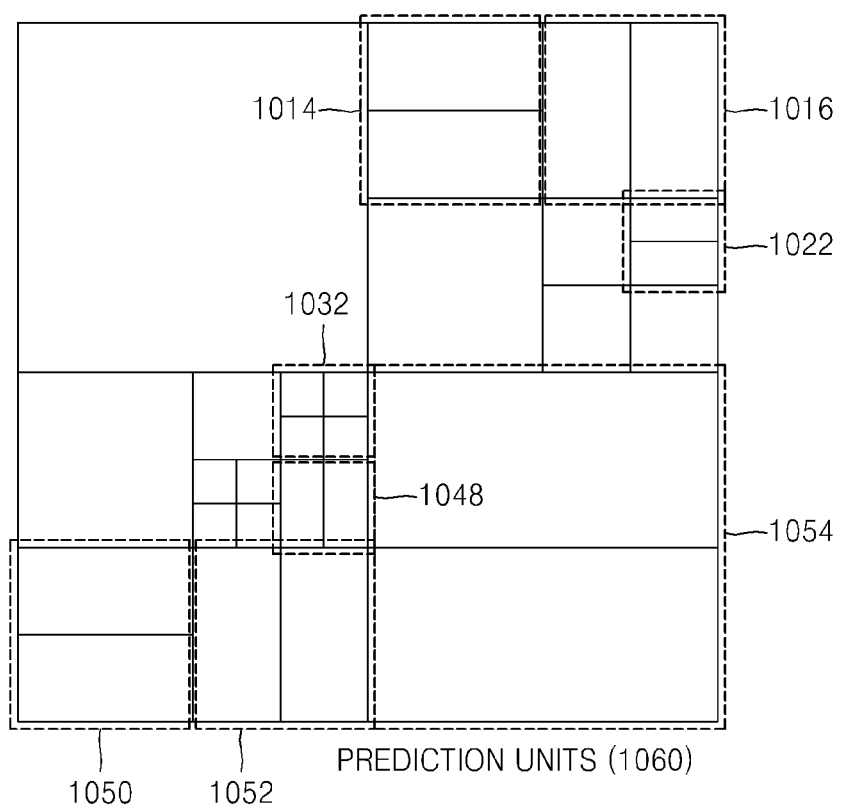
Figure 12:
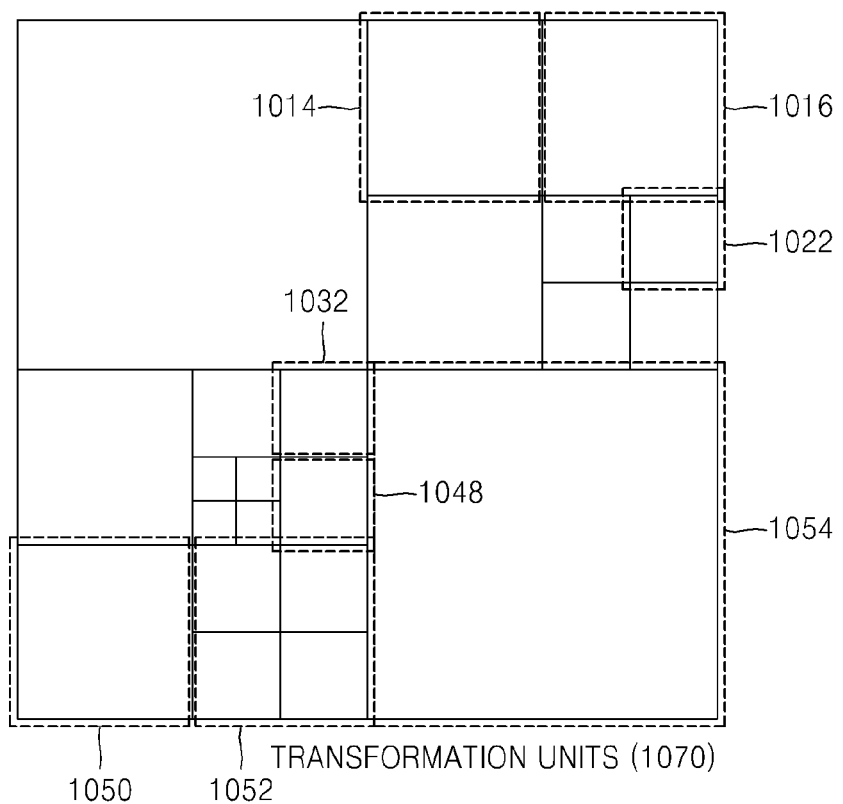

FIGS. 10 through 12 are diagrams for describing a relationship between coding units 1010, prediction units 1060, and transformation units 1070, according to an exemplary embodiment.

The coding units 1010 in FIG. 10 are coding units having a tree structure, corresponding to coded depths determined by the video encoding apparatus 100, in a maximum coding unit. The prediction units 1060 in FIG. 11 are partitions of prediction units of each of the coding units 1010, and the transformation units 1070 in FIG. 12 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Transformation index information according to an exemplary embodiment may present information regarding a structure of a transformation unit used to transform a current coding unit. For example, the transformation index information according to an exemplary embodiment may include information regarding the number of times splitting is performed from the current coding unit to a last level transformation unit and a size and format of a transformation unit. Information regarding an encoding mode according to an exemplary embodiment, i.e. encoding information, may include information regarding various methods used to encode the current coding unit, etc. and the transformation index information.

Transformation index information according to an exemplary embodiment may represent whether a current transformation unit is split into lower level transformation units. For example, a transformation unit split bit indicating whether the current transformation unit is split into the lower level transformation units may be used as the transformation index information according to an exemplary embodiment.

Transformation index information according to an exemplary embodiment may represent whether a current coding unit is split into uniform size transformation units. For example, the transformation index information according to an exemplary embodiment may represent whether a height and width of the current coding unit is halved once and split into four transformation units or is halved twice and split into sixteen transformation units. More specifically, the transformation index information according to an exemplary embodiment may represent the number of powers of 4 of the same size transformation units that are split from the current coding unit.

Transformation index information according to another exemplary embodiment may represent whether a current coding unit is split into various size transformation units according to a tree structure. For example, the transformation index information according to another exemplary embodiment may be expressed as a bit string of transformation unit split bits of each level transformation unit, arranged according to levels from the current coding unit to split into transformation units according to the tree structure. The transformation index information according to another exemplary embodiment may include a bit string of transformation unit split units of the same level transformation unit in a zigzag scanning order of each transformation unit. Furthermore, when a predetermined transformation unit is split into lower level transformation units of a hierarchical structure, the transformation index information according to another exemplary embodiment may include a bit string of transformation unit split units of the lower level transformation units in a zigzag scanning order of each lower level transformation unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
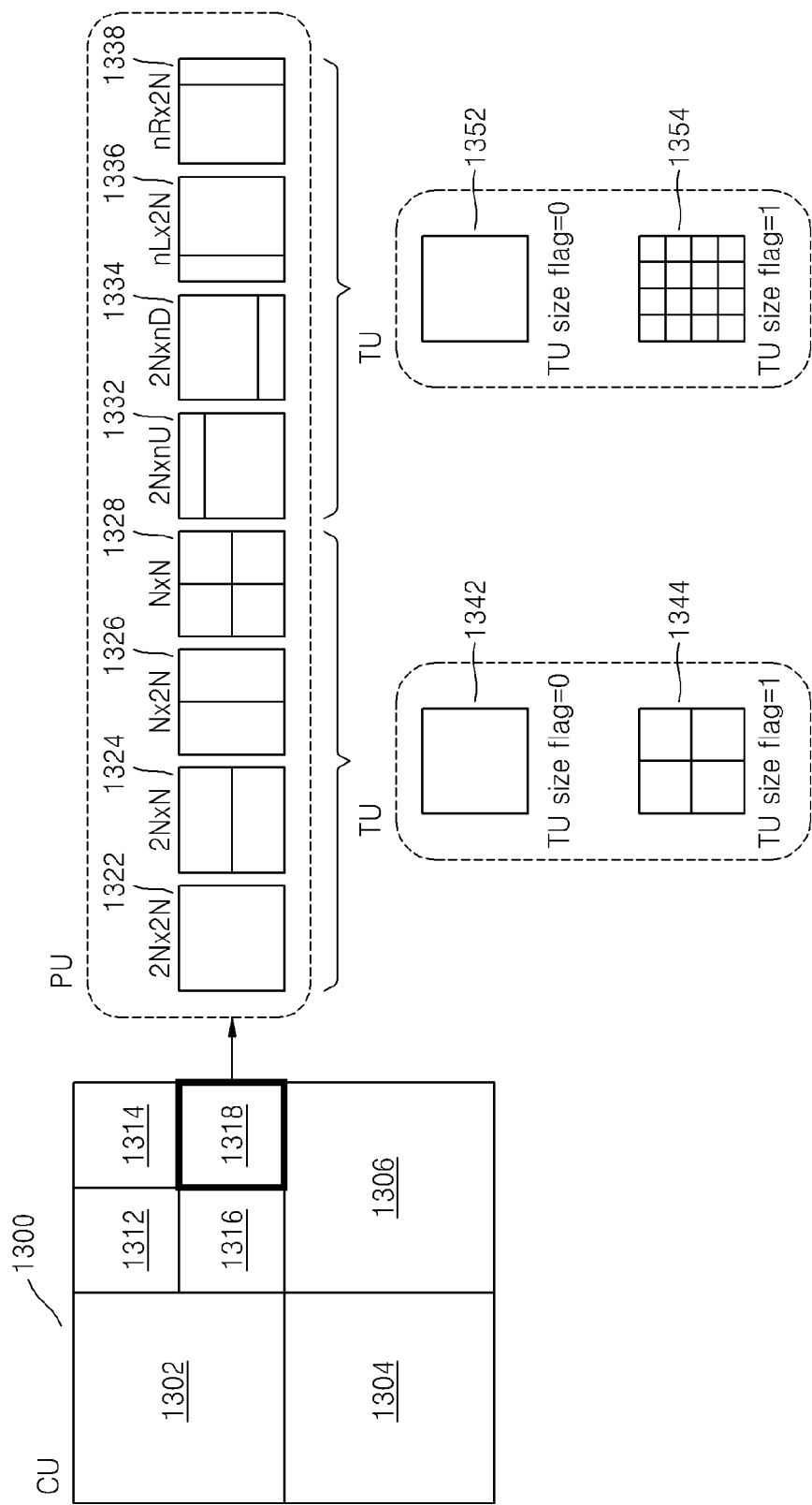
FIG. 13 is a diagram for describing a relationship between a coding unit, a prediction unit or a partition, and a transformation unit, according to encoding mode information of an exemplary embodiment in Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is one of transformation indices according to an exemplary embodiment. A size of the split information (TU size flag) of a transformation unit corresponding to a transformation index may depend on a prediction unit type of a coding unit or a partition type of the coding unit and a prediction type of the prediction unit or the partition.

For example, when the partition type is set to be symmetrical, i.e. the partition type 1322, 1324, 1326, or 1328, a transformation unit 1342 having a size of 2N×2N is set if the split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, but the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\wedge}\text{MaxTransformSizeIndex})) \quad \text{Equation (1)}$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad \text{Equation (2)}$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad \text{Equation (3)}$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and is not limited thereto.

Figure 14:
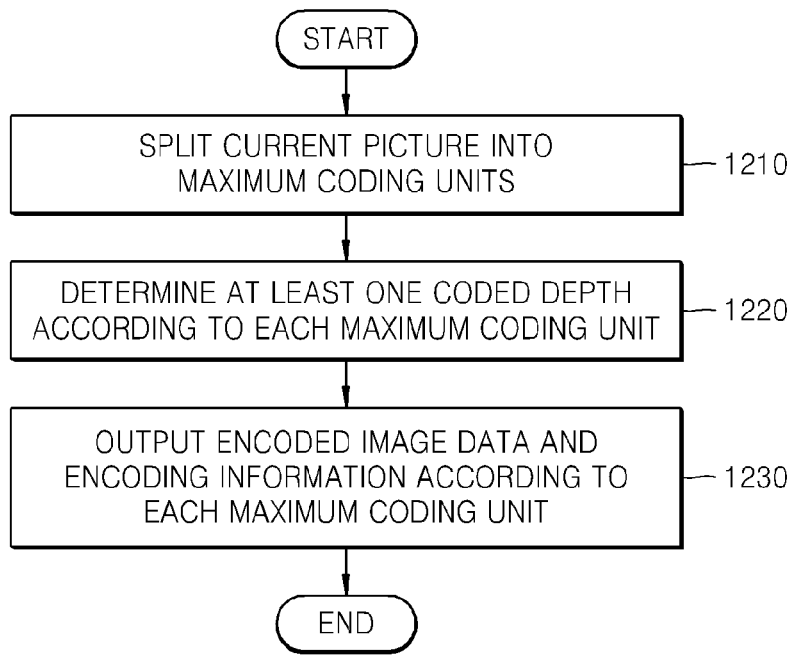
FIG. 14 is a flowchart illustrating a method of encoding a video, according to an exemplary embodiment.

FIG. 14 is a flowchart illustrating a method of encoding a video, according to an exemplary embodiment.

In operation 1210, a current picture is split into at least one maximum coding unit. A maximum depth indicating the total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

In operation 1230, encoded image data constituting the final encoding result according to the coded depth is output for each maximum coding unit, with encoding information about the coded depth and an encoding mode. The information about the encoding mode may include information about a coded depth or split information, information about a partition type of a prediction unit, a prediction mode, and a size of a transformation unit. The encoded information about the encoding mode may be transmitted to a decoder with the encoded image data.

Figure 15:
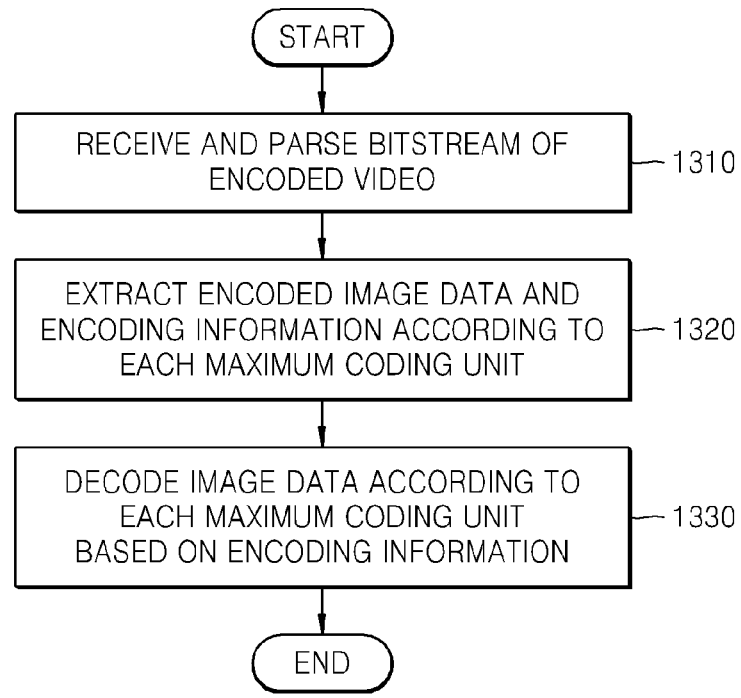
FIG. 15 is a flowchart illustrating a method of decoding a video, according to an exemplary embodiment.

FIG. 15 is a flowchart illustrating a method of decoding a video, according to an exemplary embodiment.

In operation 1310, a bitstream of an encoded video is received and parsed.

In operation 1320, encoded image data of a current picture assigned to a maximum coding unit, and information about a coded depth and an encoding mode according to maximum coding units are extracted from the parsed bitstream. The coded depth of each maximum coding unit is a depth having the least encoding error in each maximum coding unit. In encoding each maximum coding unit, the image data is encoded based on at least one data unit obtained by hierarchically splitting the each maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the least encoding error. Accordingly, encoding and decoding efficiency of an image may be improved by decoding each piece of encoded image data in the coding units after determining at least one coded depth according to coding units.

In operation 1330, the image data of each maximum coding unit is decoded based on the information about the coded depth and the encoding mode according to the maximum coding units. The decoded image data may be reproduced by a reproducing apparatus, stored in a storage medium, or transmitted through a network.

Figure 16:
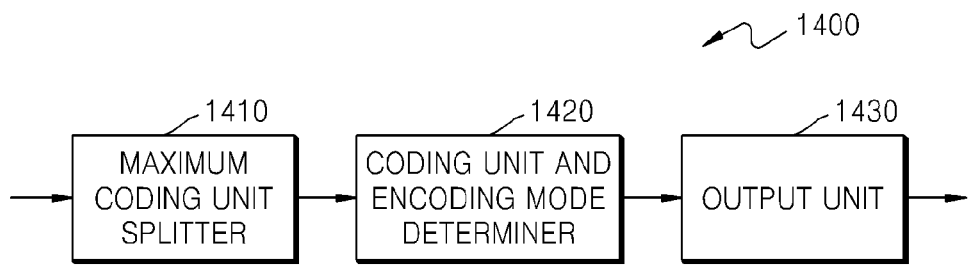
FIG. 16 is a block diagram of a video encoding apparatus using pattern information of a hierarchical data unit, according to an exemplary embodiment.

FIG. 16 is a block diagram of a video encoding apparatus 1400 using pattern information of a hierarchical data unit, according to an exemplary embodiment.

Referring to FIG. 16, the video encoding apparatus 1400 includes a maximum coding unit splitter 1410, a coding unit and encoding mode determiner 1420, and an output unit 1430. The video encoding apparatus 1400, which is configured to consider skip and split orders, is an embodiment of the video encoding apparatus 100. The maximum coding unit splitter 110, the coding unit determiner 120, and the output unit 130 of the video encoding apparatus 100 may correspond to the maximum coding unit splitter 1410, the coding unit and encoding mode determiner 1420, and the output unit 1430, respectively.

The maximum coding unit splitter 1410 splits a picture of input video into maximum coding units of predetermined sizes, and outputs video data for each maximum coding unit to the coding unit and encoding mode determiner 1420.

The coding unit and encoding mode determiner 1420 hierarchically splits regions of the maximum coding units input from the maximum coding unit splitter 1410 according to depths, and independently performs encoding on each hierarchically split region based on deeper coding units according to depths corresponding to the number of times splitting is performed.

Furthermore, the encoding based on a deeper coding unit of a depth is accompanied by prediction based on prediction units having formats and sizes smaller than or equal to the deeper coding unit of the depth, and transformation based on transformation units of all sizes smaller than or equal to the deeper coding unit of the depth.

Therefore, the coding unit and encoding mode determiner 1420 may determine at least one coded depth to output encoding video data and a partition type of a coding unit of the at least one coded depth, a prediction mode, and a size of a transformation unit. Information regarding the coding unit of the determined coded depth may be determined as information regarding encoding modes.

The coding unit and encoding mode determiner 1420 may encode video data based on the deeper coding units according to depths and search for a coded depth having fewest encoding errors between the video data and original video data and a encoding mode related to the coded depth, in order to determine a coded depth to output encoded video data for each independent region of the maximum coding unit and an encoding mode related to the coded depth. Accordingly, the coding unit and encoding mode determiner 1420 may determine coding units having a tree structure including coding units of coded depths for every maximum coding unit.

Information regarding the coded depth and the encoding mode related to the coded depth determined by the coding unit and encoding mode determiner 1420, and corresponding encoded video data are output to the output unit 1430.

The output unit 1430 outputs pattern information for each maximum coding unit, the information regarding the coded depth and the encoding mode related to the coded depth, and the encoded video data. Also, the output unit 1430 may output information regarding a maximum size of coding units.

The output unit 1430 may set whether to output texture related information of a coding unit based on the pattern information. The texture related information includes a transformation coefficient of a corresponding data unit and an index and quantization parameter of a transformation unit. When at least a non-zero coefficient of a data unit exits, texture related information of the data unit may be encoded.

The pattern information may include hierarchical coding unit pattern information, maximum coding unit pattern information, and coding unit pattern information that are set based on a hierarchical structure of a coding unit and a corresponding maximum coding unit.

The hierarchical coding unit pattern information indicates whether the texture related information and the coding unit pattern information regarding a transformation unit of a lower transformation depth are encoded. The hierarchical coding unit pattern information is hierarchically set from a coding unit of a coded depth of a current maximum coding unit to a final transformation unit of an encoding mode.

A transformation unit of a current transformation depth includes four transformation units of a lower transformation depth, and thus corresponding hierarchical coding unit pattern information for each transformation depth recursively determines whether to encode transformation texture related information and coding unit pattern information of the four lower transformation depths.

The output unit 1430 may set hierarchical coding unit pattern information of a current transformation unit as 1 when texture related information and coding unit pattern information of the transformation unit of the current transformation depth are not encoded, and coding unit pattern information of the transformation unit of the lower transformation depth is encoded.

However, when an encoding mode of the current transformation depth is a final transformation depth, and texture related information based on the current transformation unit exists, the output unit 1430 may set the hierarchical coding unit pattern information of the current transformation unit as 1.

The output unit 1430 may also set the hierarchical coding unit pattern information of the current transformation unit as 0 when the texture related information and the coding unit pattern information of the transformation unit of the current transformation depth are encoded, and the coding unit pattern information of the transformation unit of the lower transformation depth is not encoded.

The output unit 1430 may output coding unit pattern information indicating whether texture related information regarding a transformation unit of the final transformation depth according to the encoding modes is encoded.

The maximum coding unit pattern information indicates whether texture related information of the current maximum coding unit is encoded. The output unit 1430 may set whether to output hierarchical coding unit pattern information of coding units of coded depths of the maximum coding units by using the maximum coding unit pattern information.

For example, if no texture information of the maximum coding units exists, maximum coding unit pattern information of a corresponding maximum coding unit is set as 0, and it is unnecessary to output coding unit pattern information, hierarchical coding unit pattern information, and texture related information of coding units of lower depths. However, if texture information of the maximum coding units exists, the maximum coding unit pattern information of the corresponding maximum coding unit is set as 1, and the output coding unit pattern information, hierarchical coding unit pattern information, and texture related information of coding units of lower depths may be set.

Therefore, the maximum coding unit pattern information, the hierarchical coding unit pattern information of coding units and transformation units, and the coding unit pattern information may be output as pattern information with respect to a single maximum coding unit.

The pattern information may be encoded for each color component and each prediction mode.

Group pattern information may be encoded to indicate whether texture related information is encoded for color components. The group pattern information may be set with respect to a combination of color components including at least one of the color components. That is, the group pattern information may be encoded to indicate whether at least a non-zero coefficient of the color components belonging to the combination of color components exists.

For example, the group pattern information may be set indicating whether texture related information is encoded for the color components with respect to at least one combination of a Y component, a Cr component, and a Cb component. More specifically, the group pattern information may indicate whether texture related information is encoded for all color components of a luma component and chroma components. As another example, the group pattern information may be set for texture related information for the color components of the chroma components excluding the luma component.

Whether to encode the pattern information for each color component may be determined based on the group pattern information. Furthermore, if pattern information regarding a color component excluding the color components belonging to the combination of color components exists, the pattern information may be additionally encoded.

Density pattern information may be encoded according to a density of transformation unit pattern information in order to skip redundant or unnecessary pattern information. As an example of the density pattern information, single level pattern information or reverse pattern information may be encoded.

The output unit 1430 may selectively determine whether to encode hierarchical pattern information according to hierarchical data units that use the hierarchical coding unit pattern information, the coding unit pattern information, the maximum coding unit pattern information, etc. or whether to encode pattern information of a different way. For example, the output unit 1430 may determine whether to encode the hierarchical pattern information according to the hierarchical data units or the density pattern information, according to a coded depth of a current coding unit.

The output unit 1430 may determine whether to encode the hierarchical pattern information according to the hierarchical data units or the density pattern information, according to an encoding mode of a current coding unit. For example, the output unit 1430 may determine whether to encode the hierarchical pattern information with respect to a current coding unit or the density pattern information, based on at least one of a color component such as a luma component or a chroma component of image data of the current coding unit, a quantization parameter, a prediction mode such as an inter mode or an intra mode, a slice type such as an I type, a P type, or a B type, a prediction mode of the inter mode such as a bidirectional prediction or a unidirectional prediction, among encoding modes of the current coding unit.

The output unit 1430 may encode pattern information type information indicating whether the hierarchical pattern information according to the hierarchical data units or the density pattern information has been encoded as pattern information of the current coding unit. For example, the pattern information type information may be encoded in the form of a flag indicating that the pattern information has not been encoded by using the hierarchical pattern information.

Another piece of pattern information type information may be expressed as an index indicating various pieces of pattern information, such as the hierarchical pattern information, the group pattern information for each color component, the single level pattern information, reverse pattern information, etc.

Therefore, the output unit 1430 may output texture information of encoded data based on hierarchically set pattern information according to the maximum coding units, the coding units, and the transformation units by inserting the texture information into a transfer bitstream.

Figure 17:
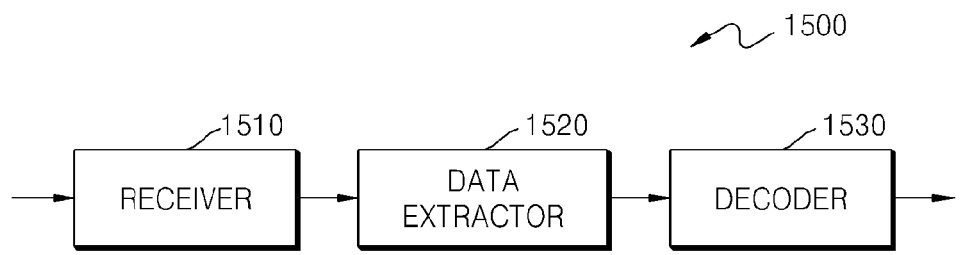
FIG. 17 is a block diagram of a video decoding apparatus using pattern information of a hierarchical data unit, according to an exemplary embodiment.

FIG. 17 is a block diagram of a video decoding apparatus 1500 using pattern information of a hierarchical data unit, according to an exemplary embodiment.

Referring to FIG. 17, the video decoding apparatus 1500, which is configured to consider skip and split orders, includes a receiver 1510, a data extractor 1520, and a decoder 1530. The video decoding apparatus 1500, which is configured to consider skip and split orders, is an embodiment of the video decoding apparatus 200. The receiver 210, the image data and encoding information extractor 220, and the image data decoder 230 of the video decoding apparatus 200 may correspond to the receiver 1510, the data extractor 1520, and the decoder 1530 of the video decoding apparatus 1500.

The receiver 1510 receives and parses a bitstream of an encoded video.

The data extractor 1520 receives the parsed bitstream from the receiver 1510 and extracts encoding information related to a coded depth and an encoding mode for each maximum coding unit and encoded video data from the bitstream. Also, the data extractor 1520 may extract information regarding a maximum size of coding units from the bitstream.

In particular, the data extractor 1520 may extract pattern information from the parsed bitstream from the receiver 1510, and extract texture related information from video data encoded based on the pattern information.

The data extractor 1520 may extract hierarchical coding unit pattern information, coding unit pattern information, and maximum coding unit pattern information as the pattern information.

First, when the data extractor 1520 extracts the coding unit pattern information, the data extractor 1520 may determine whether to extract texture related information with respect to a corresponding transformation unit based on the coding unit pattern information. The texture related information includes transformation coefficients of the corresponding transformation unit, an index of a transformation unit, and a quantization parameter, etc.

When the data extractor 1520 extracts the hierarchical coding unit pattern information, the data extractor 1520 may determine whether to hierarchically extract texture related information and the coding unit pattern information of a transformation unit of a lower transformation depth based on the hierarchical coding unit pattern information.

The data extractor 1520 may determine whether to extract the coding unit pattern information and the texture related information of the transformation unit of the lower transformation depth, based on the hierarchical coding unit pattern information, recursively from a current coding unit to a transformation unit according to encoding modes.

If the hierarchical coding unit pattern information is 1, the data extractor 1520 may not extract texture related information and coding unit pattern information of a transformation unit of a current transformation depth, but may extract the coding unit pattern information of the transformation unit of the lower transformation depth. However, if the current transformation depth is a final transformation depth and the hierarchical coding unit pattern information is 1, the data extractor 1520 may extract texture related information based on a current transformation unit.

If the hierarchical coding unit pattern information is 0, the data extractor 1520 may extract the texture related information and coding unit pattern information of the transformation unit of the current transformation depth, but may not necessarily extract the coding unit pattern information of the transformation unit of the lower transformation depth.

When the data extractor 1520 extracts the maximum coding unit pattern information, the data extractor 1520 may determine whether to extract the hierarchical coding unit pattern information of coding units of coded depths of maximum coding units based on the maximum coding unit pattern information.

For example, if the maximum coding unit pattern information is 1, the data extractor 1520 may determine whether to extract the hierarchical coding unit pattern information of coding units of coded depths of maximum coding units. If the maximum coding unit pattern information is 0, the data extractor 1520 does not extract texture related information of a corresponding maximum coding unit.

The data extractor 1520 may not extract transformation index information if pattern information of a transformation unit having a highest transformation depth of 0 is 0. If the pattern information of the transformation unit having the highest transformation depth of 0 is not 0, the data extractor 1520 may extract transformation index information from encoding mode information of a current coding unit, and transformation unit pattern information for each transformation depth.

The data extractor 1520 may extract pattern information for each color component or pattern information for each prediction mode.

The data extractor 1520 may determine whether at least a non-zero coefficient for each color component of a current data unit exits by reading group pattern information, and determine whether to extract pattern information for each color component. The data extractor 1520 may determine whether at least a non-zero coefficient for each color component of at least one color component belonging to a color component combination exists by reading the group pattern information, and determine whether to extract pattern information for each color component belonging to the color component combination.

For example, the data extractor 1520 may analyze whether at least a non-zero coefficient for each color component with respect to at least one combination of a Y component, a Cr component, and a Cb component exists, based on the group pattern information. More specifically, the data extractor 1520 may determine whether at least a non-zero coefficient for each color component with respect to all color components of a luma component and chroma components exists based on the group pattern information. As another example, the data extractor 1520 may determine whether the non-zero coefficient for each color component with respect to color components of the chroma components, other than the luma component, exists, based on the group pattern information.

The data extractor 1520 may determine whether to extract pattern information for each color component belonging to a color component combination based on the group pattern information, and additionally extract pattern information for a color component excluding the color components belonging to the color component combination if such a color component exists.

The data extractor 1520 may extract density pattern information from which redundant or unnecessary pattern information is omitted, according to density of transformation unit pattern information.

The data extractor 1520 may extract in another way hierarchical pattern information according to a hierarchical data unit or pattern information. For example, the data extractor 1520 may extract hierarchical pattern information or density pattern information that is selectively encoded according to a coded depth of a current coding unit.

The data extractor 1520 may extract hierarchical pattern information according to a hierarchical data unit or density pattern information that is selectively encoded according to an encoding mode of a current coding unit. For example, the data extractor 1520 may extract pattern information of the current coding unit that is selectively encoded as the hierarchical pattern information or the density pattern information, based on at least one of a color component, a quantization parameter, a prediction mode, a slice type, and a prediction direction of an inter mode among encoding modes of the current coding unit.

The data extractor 1520 may extract pattern information type information indicating whether the hierarchical pattern information according to the hierarchical data unit or the density pattern information has been encoded. For example, the data extractor 1520 may determine whether pattern information of a current coding unit is the hierarchical pattern information or the density pattern information by reading pattern information type information that is in the form of a flag indicating whether current pattern information is the hierarchical pattern information.

Alternatively, whether the extracted pattern information is one of various pieces of pattern information, such as the hierarchical pattern information, the group pattern information for each color component, the single level pattern information, and the reverse pattern information by reading pattern information type information expressed in an index indicating various pieces of pattern information.

The decoder 1530 receives the encoding mode information and the encoded video data from the data extractor 1520, and decodes the encoded video data of a picture for each coding unit of at least one coded depth among coding units having a tree structure, based on information regarding the coded depths and the encoding modes.

The decoded and restored video data may be transmitted to various types of reproducible terminals or storage devices.

The video encoding apparatus 1400 using the pattern information of the hierarchical data unit according to an exemplary embodiment and the video decoding apparatus 1500 using the pattern information of the hierarchical data unit according to an exemplary embodiment may determine data units to be applied to the pattern information based on the density of the coding unit pattern information. For example, if the coding unit pattern information is not dense, the maximum coding unit pattern information of a maximum coding unit level is used to improve a bit rate. However, if the coding unit pattern information is dense, the maximum coding unit pattern information may not be used to improve the bit rate. Therefore, a data unit of the pattern information is selectively adjusted, thereby increasing transmission efficiency of a bitstream.

Various pieces of pattern information of hierarchical data units according to exemplary embodiments will now be described with reference to FIGS. 18 through 26.

Figure 18:
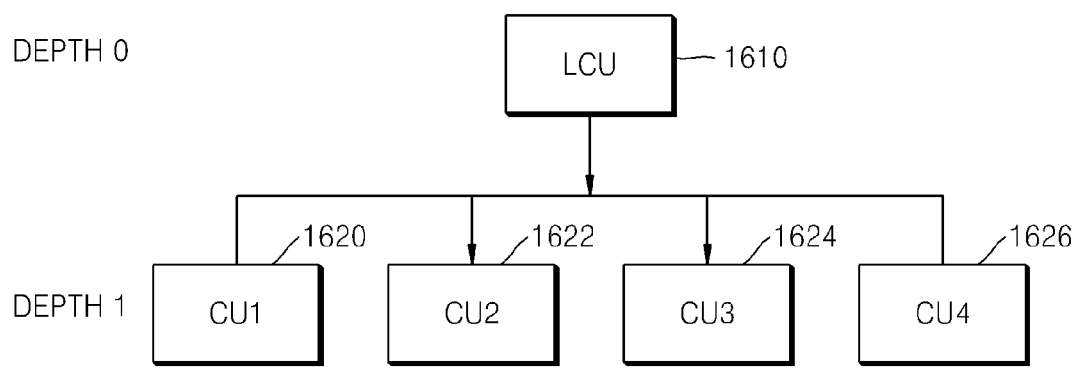
FIG. 18 illustrates a hierarchical structure of a maximum coding unit and coding units of a coded depth, according to an exemplary embodiment.

FIG. 18 illustrates a hierarchical structure of a maximum coding unit 1610 and coding units 1620, 1622, 1624, and 1626 of a coding depth, according to an exemplary embodiment.

Referring to FIG. 18, to describe pattern information, the maximum coding unit 1610 includes the coding units 1620, 1622, 1624, and 1626 of the coded depth 1. A first embodiment in which maximum coding unit pattern information is not used and a second embodiment in which the maximum coding unit pattern information is used will now be described below.

First, it is assumed that the maximum coding unit 1610 has no transformation coefficient (hereinafter, referred to as "case 1").

In the first embodiment, pattern information with respect to the coding units 1620, 1622, 1624, and 1626 may be encoded, whereas pattern information with respect to the maximum coding unit 1610 is not encoded. That is, coding unit pattern information of a transformation unit of a transformation depth 0 may be encoded with respect to each of the coding units 1620, 1622, 1624, and 1626. Therefore, the pattern information of the first embodiment for the case 1 may be output as four bits "0000".

In the second embodiment for the case 1, the maximum coding unit pattern information is encoded as "0" with respect to the maximum coding unit 1610, and the pattern information may not be necessarily set with respect to the coding units 1620, 1622, 1624, and 1626. Thus, the pattern information of the second embodiment for the case 1 may be output as one bit "0".

Therefore, when the maximum coding unit 1610 has no transformation coefficient, the maximum coding unit pattern information is used, which is advantageous in terms of the bit rate.

Second, it is assumed that the maximum coding unit 1610 has a transformation coefficient, the coding units 1622 and 1626 have no transformation coefficient, and the coding units 1620 and 1624 have transformation coefficients of a transformation unit of a transformation depth 2 (hereinafter, referred to as "case 2").

In the first embodiment, the pattern information regarding the coding units 1620, 1622, 1624, and 1626, without encoding the pattern information with respect to the maximum coding unit 1610, includes:

hierarchical coding unit pattern information "1" of the coding units 1620, 1622, 1624, and 1626 of a coded depth 1;

regarding the coding unit 1620, hierarchical coding unit pattern information "1" of a transformation unit of a transformation depth 0, hierarchical coding unit pattern information "1" and coding unit pattern information "1100" of transformation units of a transformation depth 1;

regarding the coding unit 1622, hierarchical coding unit pattern information "0" of the transformation unit of the transformation depth 0;

regarding the coding unit 1624, hierarchical coding unit pattern information "1" of the transformation unit of the transformation depth 0, hierarchical coding unit pattern information "1" coding unit pattern information "1110" of transformation units of the transformation depth 1; and regarding the coding unit 1626, hierarchical coding unit pattern information "0" of the transformation unit of the transformation depth 0 may be set.

Thus, the pattern information of the first embodiment for the case 1 may be output as fourteen bits "1 1 1 1100 0 1 1110 0".

In the second embodiment, the maximum coding unit pattern information is encoded as "1" with respect to the maximum coding unit 1610, and as the pattern information with respect to the coding units 1620, 1622, 1624, and 1626; Hierarchical coding unit pattern information "1" of the coding units 1620, 1622, 1624, and 1626 of the depth 1;

regarding the coding unit 1620, hierarchical coding unit pattern information "1" of the transformation unit of the transformation depth 0;

regarding the coding unit 1622, hierarchical coding unit pattern information "1" of the transformation depth 1 and coding unit pattern information "1100", hierarchical coding unit pattern information "0" of the transformation unit of the transformation depth 0;

regarding the coding unit 1624, hierarchical coding unit pattern information "1" of the transformation unit of the transformation depth 0; and regarding the coding unit 1626, hierarchical coding unit pattern information "1" of the transformation depth 1 and coding unit pattern information "1110", and hierarchical coding unit pattern information "0" of the transformation unit of the transformation depth 0 may be set.

Thus, the pattern information of the second embodiment for the case 2 may be output as fifteen bits "1 1 1 1 1100 0 1 1110 0".

Therefore, when the coding unit pattern information is dense within the maximum coding unit, the maximum coding unit pattern information is not used, which is advantageous in terms of the bit rate.

The video encoding apparatus 1400 using the pattern information of the hierarchical data unit according to an exemplary embodiment may adjust a level of a data unit applied to the pattern information by analyzing a density of the coding unit pattern information of the maximum coding unit. Although the maximum coding unit pattern information is described above, the present invention is not limited thereto and may be applied to a coding unit of a predetermined depth within the maximum coding unit and a predetermined data unit such as a plurality of maximum coding unit groups.

Figure 19:
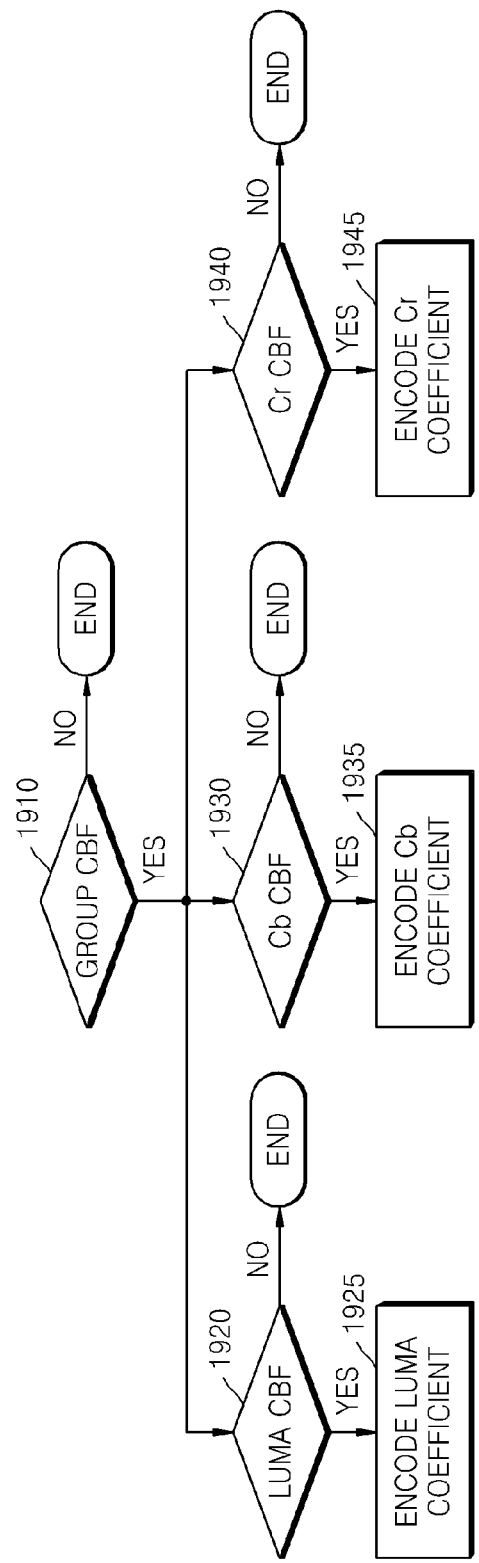
FIGS. 19, 20A-B, and 21A-C are flowcharts of encoding processes using group pattern information, according to exemplary embodiments.

FIGS. 19, 20, and 21 are flowcharts of encoding processes using group pattern information, according to exemplary embodiments.

The output unit 1430 of the video encoding apparatus 1400 may encode pattern information for each color component of video data. For example, luma pattern information with respect to a data unit of a luma component coefficient, Cb pattern information with respect to a data unit of a Cb component coefficient, and Cr pattern information with respect to a data unit of a Cr component coefficient may be encoded.

The output unit 1430 may encode the pattern information for each color component after encoding group pattern information with respect to video data for each color component of a single data unit.

Referring to FIG. 19, in operation 1910, the group pattern information (group CBF) may be set with respect to video data of a luma component, a Cb component, and a Cr component of a current data unit. In operation 1910, if the group pattern information is set as 0, an operation for setting the pattern information with respect to the current data unit ends, and, if the group pattern information is set as 1, luma pattern information (luma CBF), Cb pattern information (Cb CBF), and Cr pattern information (Cr pattern information) for each color component may be set in operations 1920, 1930, and 1940, respectively.

In operation 1920, if the luma pattern information (luma CBF) is set as 1, a luma component coefficient is encoded in operation 1925, and, if the luma pattern information (luma CBF) is set as 0, operation 1925 may be skipped. Similarly, in operation 1930, if the Cb pattern information (Cb CBF) is set as 1, a Cb component coefficient is encoded in operation 1935, and, if the Cb pattern information (Cb CBF) is set as 0, operation 1935 may be skipped. Similarly, in operation 1940, if the Cr pattern information (Cr pattern information) is set as 1, a Cr component coefficient is encoded in operation 1945, and, if the Cr pattern information (Cr pattern information) is set as 0, operation 1945 may be skipped.

Figure 20A:
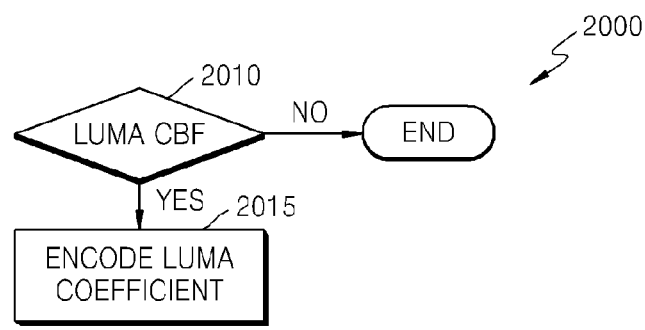
Figure 20B:
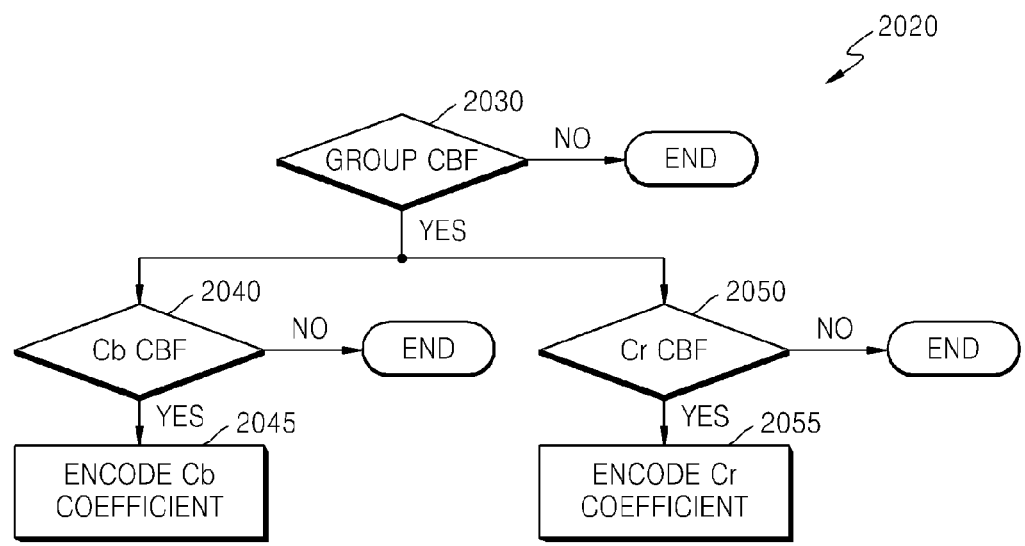

Referring to FIGS. 20A and 20B, the luma pattern information (luma CBF) is separately set with respect to the luma component coefficient of the current data unit (flowchart 2000 in FIG. 20A), and the group pattern information may be set with respect to chroma component coefficients, i.e. the Cb component coefficient and the Cr component coefficient (flowchart 2020 in FIG. 20B).

In operation 2010, if the luma pattern information (luma CBF) is set as 1 with respect to the luma component coefficient of the current data unit, the luma component coefficient is encoded in operation 2015, and if the luma pattern information (luma CBF) is set as 0, operation 2015 may be skipped.

In operation 2030, the group pattern information may be set with respect to the video data of the Cb component and the Cr component of the current data unit. In operation 2030, if the group pattern information is set as 0, an operation of setting the pattern information with respect to the current data unit ends, and operations for encoding the Cb component coefficient and the Cr component coefficient end. In operation 2030, if the group pattern information is set as 1, the Cb pattern information (Cb CBF) and the Cr pattern information (Cr CBF) may be encoded in operations 2045 and 2055, respectively.

In operation 2040 (or operation 2050), if the Cb pattern information (Cb CBF) (or the Cr pattern information (Cr CBF)) is set as 1, the Cb component coefficient (or the Cr component coefficient) is encoded in operation 2045 (or operation 2055), and, if the Cb pattern information (Cb CBF) (or the Cr pattern information (Cr CBF)) is set as 0, operation 2045 (or operation 2055) may be skipped.

Figure 21A:
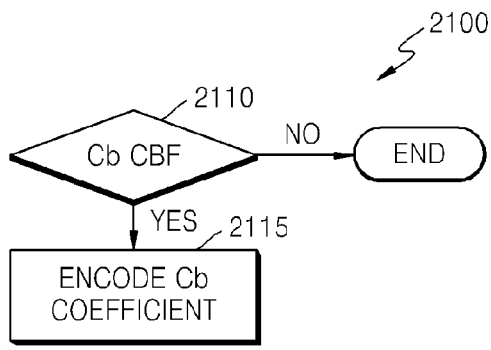
Figure 21B:
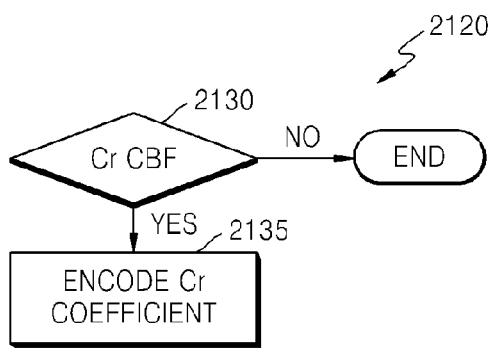
Figure 21C:
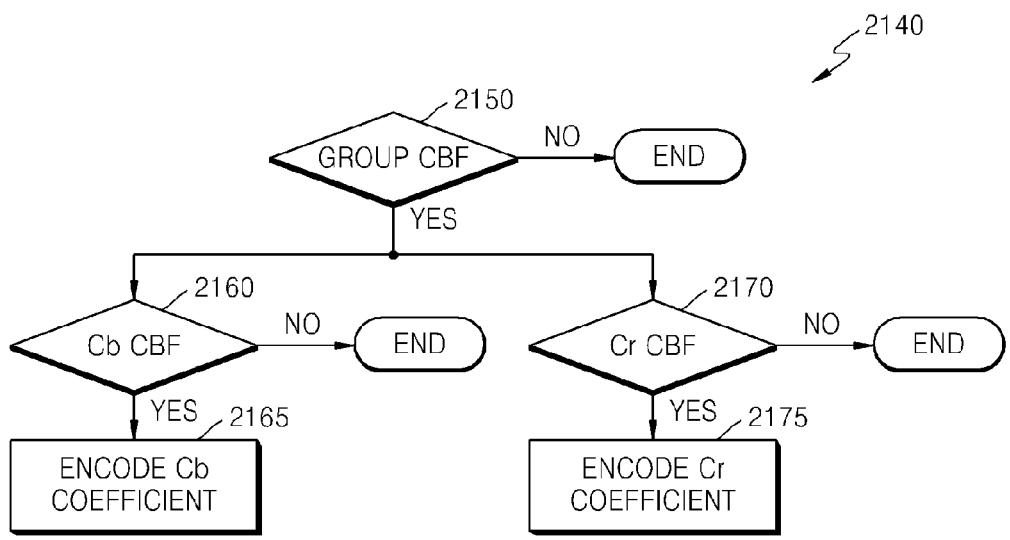

Referring to FIGS. 21A, 21B, and 21C, the luma pattern information (luma CBF) of the current data unit may be separately set, and whether the group pattern information is set with respect to the chroma component coefficients of the current data unit may be determined according to a set value of the luma pattern information (luma CBF).

For example, if the set value of the luma pattern information (luma CBF) is 1, the group pattern information with respect to color components is not encoded (flowcharts 2100 in FIG. 21A and 2120 in FIG. 21B), and if the set value of the luma pattern information (luma CBF) is 0, the group pattern information with respect to the Cb component coefficient and the Cr component coefficient may be encoded (flowchart 2140 in FIG. 21C).

More specifically, if the luma pattern information (luma CBF) is set as 1 since the luma component coefficient that is not 0 exists in the current data unit, in operation 2110, the Cb pattern information (Cb CBF) may be set according to whether the Cb component efficient that is not 0 exists, and in operation 2115, the Cb component coefficient that is not 0 may be encoded. Likewise, in operation 2130, the Cr pattern information (Cr CBF) may be set according to whether the Cr component efficient that is not 0 exists, and in operation 2135, the Cr component coefficient that is not 0 may be encoded.

If the luma pattern information (luma CBF) is set as 0 since the luma component coefficient that is not 0 does not exist in the current data unit, in operation 2150, the group pattern information may be set according to whether the Cb component efficient and the Cr component coefficient that are not 0 exist in the current data unit. In operation 2150, if the group pattern information is set as 0 since the Cb component efficient and the Cr component coefficient that are not 0 do not exist, the operations for setting the Cb pattern information (Cb CBF) and the Cr pattern information (Cr CBF) of the current data unit and the operations for encoding the Cb component coefficient and the Cr component coefficient end.

In operation 2150, the group pattern information is set as 1 since the Cb component efficient and the Cr component coefficient that are not 0 exist in the current data unit, the Cb component efficient and the Cr component coefficient may be encoded in operations 2160 and 2170, respectively. In operation 2160, the Cb pattern information (Cb CBF) is set according to whether the Cb component coefficient that is not 0 exists, and in operation 2165, the Cb component coefficient that is not 0 may be encoded. Likewise, in operation 2170, the Cr pattern information (Cr CBF) is set according to whether the Cr component coefficient that is not 0 exists, and in operation 2175, the Cr component coefficient that is not 0 may be encoded.

Therefore, the data extractor 1520 of the video decoding apparatus 1500 according to an exemplary embodiment may extract pattern information for each color component of video data. The data extractor 1520 may also extract pattern information for each color component according to a result of reading group pattern information with respect to the video data for each color component of a single data unit.

The output unit 1430 of the video decoding unit 1400 according to an exemplary embodiment may output density pattern information in a format for improving a density of pattern information of a hierarchical data unit.

Figure 22:
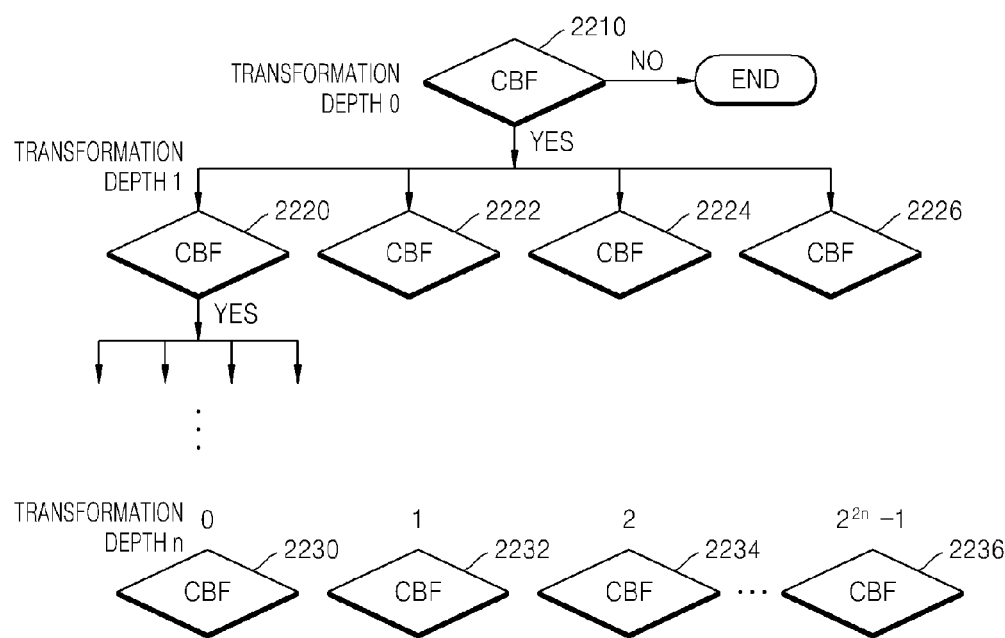
FIGS. 22 and 23 are diagrams for comparing processes for encoding hierarchical data unit pattern information and single level pattern information, according to exemplary embodiments.
Figure 23:
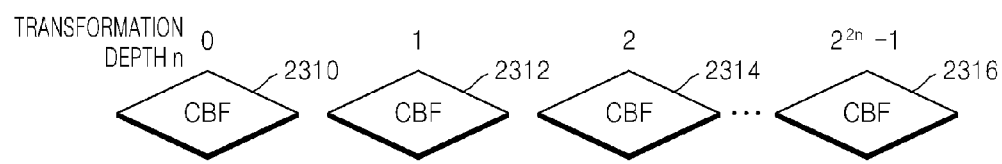

FIGS. 22 and 23 are diagrams for comparing processes for encoding hierarchical data unit pattern information and single level pattern information, according to exemplary embodiments.

Referring to FIGS. 22 and 23, for descriptive convenience, it is assumed that a transformation unit of an upper transformation depth is equally split into four transformation units of a lower transformation depth according to transformation depths. However, pattern information of the transformation unit is not limited thereto, and the transformation unit of the upper transformation depth may be split into various types of transformation units of the lower transformation depth.

FIG. 22 is a flowchart of the process for encoding the hierarchical data unit pattern information, according to an exemplary embodiment. If a transformation unit is determined at a transformation depth n, pattern information of transformation units from 0 to n must be set.

In more detail, in operation 2210, pattern information of a transformation unit of the transformation depth 0 is encoded. If the pattern information of a transformation unit of the transformation depth 0 is 0, coefficients of the transformation unit are not encoded. If the pattern information of the transformation unit of the transformation depth 0 is 1, pattern information of four transformation units of a transformation depth 1 that is split from the transformation unit of the transformation depth 0 may be encoded in operations 2220, 2222, 2224, and 2226. In operations 2220, 2222, 2224, and 2226, whether to encode the pattern information of the transformation unit of the lower transformation depth may be determined based on the pattern information of four transformation units of the transformation depth 1. As the transformation depth increases, pattern information of transformation units of the $2^{\wedge}(2n)$ transformation depth n from 0 to $2"(2n)-1$ may be encoded in operations 2230, 2232, 2234, and 2236.

FIG. 23 is a flowchart of the process for encoding the single level pattern information, according to an exemplary embodiment. If a transformation unit according to a tree structure is determined at the transformation depth n, the single level pattern information may be expressed as pattern information of transformation units of the transformation depth n. That is, the pattern information of transformation units of the $2^{\wedge}(2n)$ transformation depth n may be encoded as the single level pattern information in operations 2310, 2312, 2314, and 2316. Pattern information of a transformation unit of a general transformation depth, other than the transformation unit according to the tree structure within a current coding unit, may be omitted by using the single level pattern information.

Figure 24:
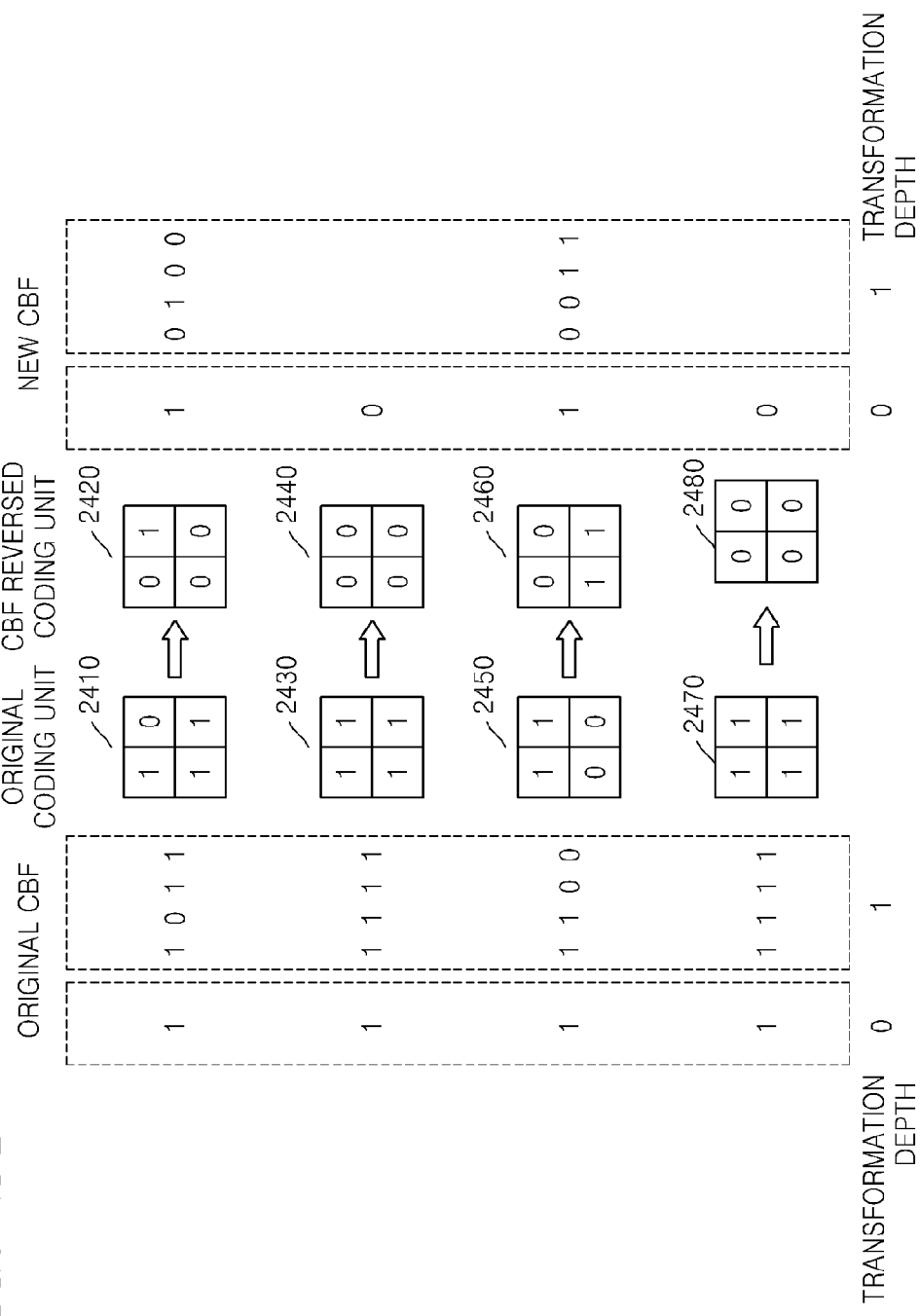
FIG. 24 is a diagram for describing a concept of reverse pattern information, according to an exemplary embodiment.

FIG. 24 is a diagram for describing a concept of reverse pattern information, according to an exemplary embodiment.

Referring to FIG. 24, the reverse pattern information may be set with respect to transformation units of coding units of an intra mode. The reverse pattern information indicates set bit values in which set values 0 and 1 of pattern information of transformation units according to a tree structure of a current coding unit are reversed as 1 and 0, respectively.

Each of original coding units 2410, 2430, 2440, and 2460 are configured to include transformation units of a transformation depth 1. Numbers indicated in the original coding units 2410, 2430, 2450, and 2470 present pattern information of transformation units. Among the transformation units of the original coding units 2410, 2430, 2450, and 2470 of the intra mode, the pattern information may not predominantly be 0.

Since the original coding unit 2410 includes transformation units having pattern information 1, 0, 1, and 1, a coding unit 2420 having reversed pattern information of transformation units may include transformation units having pattern information 0, 1, 0, and 0. That is, original hierarchical pattern information (original CBF) of the coding unit 2410 is encoded as "1" in a transformation depth 0 and "1011" in a transformation depth 1, whereas the reverse pattern information of the coding unit 2420 may be encoded as "1" in the transformation depth 0 and "0100" in the transformation depth 1.

Since the original coding unit 2430 includes transformation units having pattern information 1, 1, 1, and 1, the coding unit 2440 having reversed pattern information of transformation units may include transformation units having pattern information 0, 0, 0, and 0. That is, original hierarchical pattern information of the coding unit 2430 is encoded as "1" in the transformation depth 0 and "1111" in the transformation depth 1, whereas the reverse pattern information of the coding unit 2440 may be encoded as "0" in the transformation depth 0.

If an original coding unit 2450 includes transformation units having pattern information 1, 0, 1, 1, original hierarchical pattern information of the coding unit 2450 is encoded as "1" in the transformation depth 0 and "1100" in the transformation depth 1, whereas the coding unit 2460 having reversed pattern information of a transformation unit includes pattern information 0, 1, 0, 0 of transformation units, and thus the reverse pattern information of the coding unit 2460 may be encoded as "1" in the transformation depth 0 and "0011" in the transformation depth 1.

If an original coding unit 2470 includes transformation units having pattern information 1, 1, 1, 1, original hierarchical pattern information (original CBF) of the coding unit 2470 is encoded as "1" in the transformation depth 0 and "1111" in the transformation depth 1, whereas the coding unit 2480 having reversed pattern information of a transformation unit includes pattern information 0, 0, 0, 0 of transformation units, and thus reverse pattern information of a coding unit 2480 may be encoded as "0" in the transformation depth 0.

Figure 25:
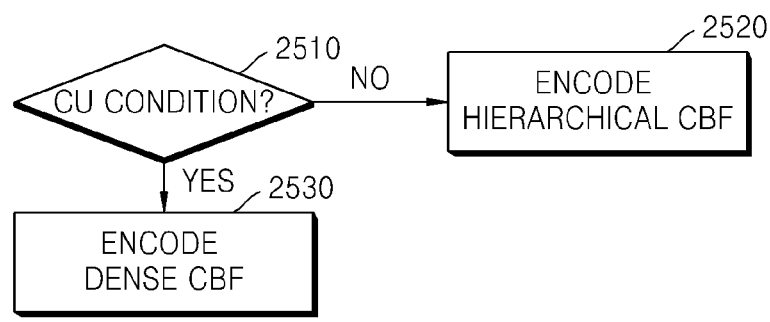
FIG. 25 is a flowchart of a process for encoding density pattern information, according to an exemplary embodiment.

FIG. 25 is a flowchart of a process for encoding density pattern information, according to exemplary embodiments.

Referring to FIG. 25, in operation 2510, if a predetermined condition is satisfied with respect to a current coding unit, in operation 2530, the output unit 1430 of the video encoding apparatus 1400 may encode the density pattern information with respect to the current coding unit. For example, the predetermined condition for encoding the density pattern information may include a condition in which a prediction mode of the current coding unit is an intra mode (or an inter mode), a condition in which a quantization parameter of the current coding unit is smaller than a threshold value, a condition in which coefficients of the current coding unit are chroma component coefficients (or luma component coefficients), etc. The density pattern information may include single level pattern information, reverse pattern information, etc.

In operation 2510, if the predetermined condition is not satisfied with respect to the current coding unit, in operation 2530, the output unit 1430 of the video encoding apparatus 1400 may encode pattern information according to a hierarchical data unit with respect to the current coding unit. More specifically, hierarchical coding unit pattern information is encoded, and whether to hierarchically encode texture related information and coding unit pattern information with respect to a transformation unit of a lower transformation depth may be determined based on the hierarchical coding unit pattern information.

The density pattern information may have an advantage since a data unit is more likely dense with an inclusion of coefficients that is not 0 when the data unit is predicted in the intra mode, includes the luma component coefficients, or has the small quantization parameter.

Therefore, the data extractor 1520 of the video decoding apparatus 1500 may extract density pattern information encoded according to a predetermined condition. Since an expression method of the density pattern information is modified according to a predetermined rule, the data extractor 1520 may extract coefficients of a corresponding data unit by correctly reading the density pattern information according to a previously defined rule.

Figure 26:
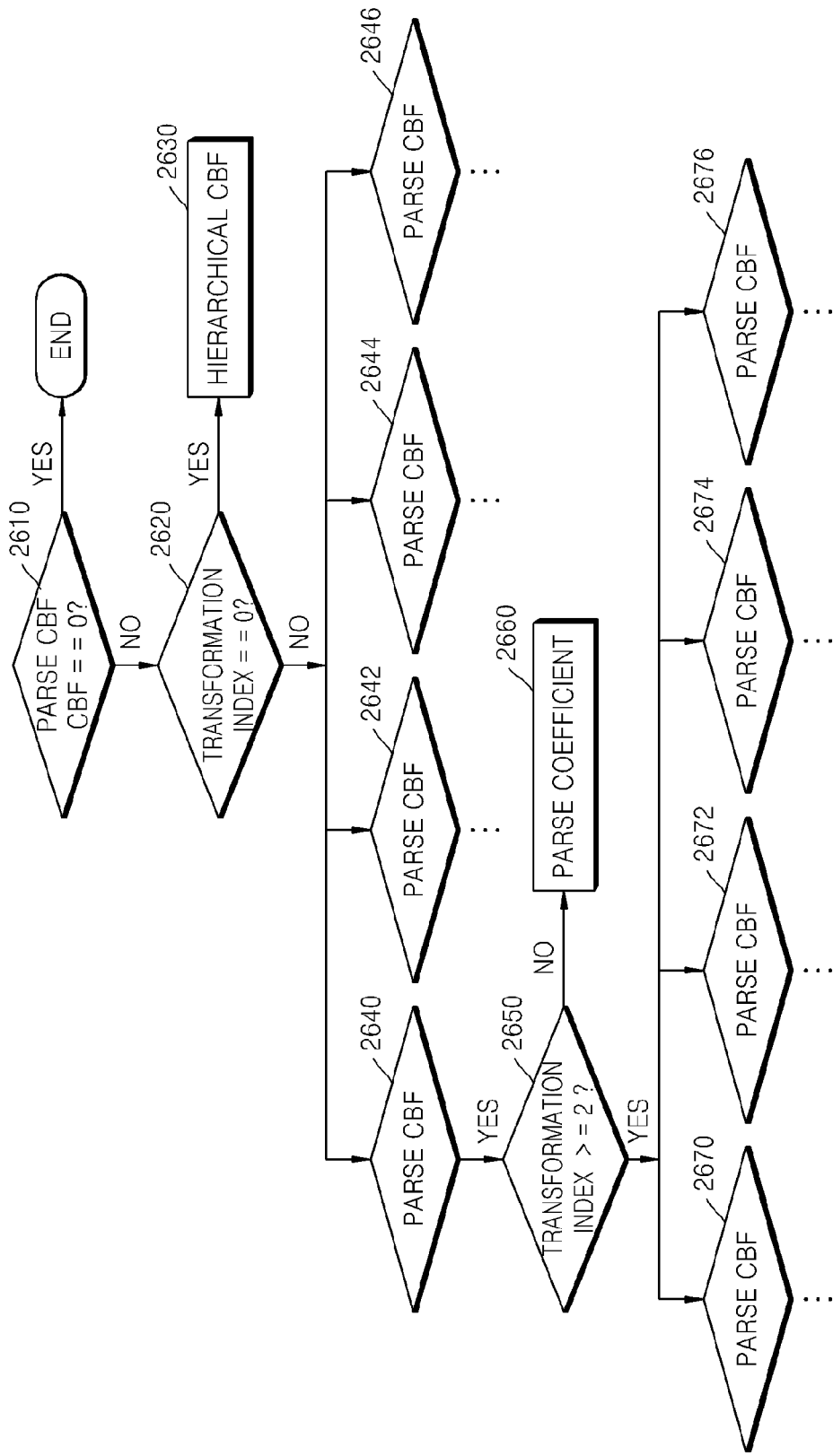
FIG. 26 is a flowchart illustrating a process for decoding transformation index and pattern information, according to an exemplary embodiment.

FIG. 26 is a flowchart illustrating a process for decoding transformation index and pattern information, according to an exemplary embodiment.

Referring to FIG. 26, since transformation index information for a coding unit is valid only when a coefficient that is not 0 exists within the coding unit, the output unit 1430 of the video encoding apparatus 1400 may encode the transformation index information of the coding unit including the coefficient that is not 0. Therefore, the data extractor 1520 of the video decoding apparatus 1500 may parse pattern information of a current coding unit in operation 2610. If the pattern information is 0, an operation for decoding with respect to the current coding unit may end without parsing the transformation index information. In operation 2610, if the parse pattern information of the current coding unit is 1, in operation 2620, the transformation index information may be parsed among information regarding an encoding mode of the current coding unit.

In operation 2610, the data extractor 1520 parses pattern information of a transformation unit of a transformation depth 0 that is identical to the current coding unit. If the pattern information is 0, an operation of decoding with respect to the current coding unit may end without parsing the transformation index information of the current coding unit. In operation 2610, if the pattern information of the transformation unit of the transformation depth 0 is 1, in operation 2620, transformation index information of the transformation unit may be parsed.

In operation 2620, if the transformation index information of the current coding unit is 0, coefficients of the current coding unit may be parsed without splitting transformation units of a lower transformation depth in operation 2630. The parsed coefficients may be decoded based on the parsed coding information. In operation 2620, if the transformation index information of the current coding unit is greater than 1, the transformation unit of the transformation depth 0 is split into transformation units of a transformation depth 1, and pattern information of the transformation units of the transformation depth 1 may be parsed in operations 2640, 2642, 2644, and 2646.

In operation 2650, if the transformation index information is smaller than 2, i.e. if the transformation index information is 1, in operation 2660, coefficients of the transformation unit of the transformation depth 1 may be parsed. The parsed coefficients may be decoded based on the parsed encoding information. In operation 2650, if the transformation index information is greater than 2, i.e. if a transformation depth of a transformation unit is greater than 2, the transformation unit of the transformation depth 1 is split into the transformation units of the transformation depth 2, and pattern information of the transformation units of the transformation depth 2 may be parsed in operations 2670, 2672, 2674, and 2676.

Such a process may be repeatedly performed until each transformation unit arrives at a transformation depth according to the transformation index information. Therefore, if the pattern information of the transformation unit of the highest transformation depth 0 is 0 from among the pattern information of the transformation unit of the current coding unit, the transformation index information is parsed once in operation 2620, whereas the pattern information of the transformation unit may be parsed for each transformation depth by each transformation depth in operations 2610, 2640, 2642, 2644, 2646, 2670, 2672, 2674, and 2676.

FIG. 27 is a flowchart illustrating a video encoding method using pattern information of a hierarchical data unit, according to an exemplary embodiment.

Referring to FIG. 27, in operation 2710, a picture is split into coding units of predetermined maximum sizes.

In operation 2720, encoding that is accompanied by transformation is performed based on at least one transformation unit of every coding unit for at least one depth, for regions that are split and reduced according to depths, with respect to each maximum coding unit. As a result of encoding, at least one coded depth having fewest coding errors and an encoding mode with respect to a coding unit of a coded depth including information regarding sizes of the at least one transformation unit may be selected. Accordingly, coding units having a tree structure may be determined with the coding units of coded depths and encoding modes.

In operation 2730, pattern information, information regarding a maximum size of coding units, information regarding the encoding mode, and encoded video data for each of the maximum coding units are output. Whether to output texture information of the encoded video data may be determined based on the pattern information. The pattern information may be set based on a hierarchical structure of the maximum coding units, the coding units, and transformation units according to the encoding mode, and may include hierarchical coding unit pattern information, maximum coding unit pattern information, and coding unit pattern information.

The pattern information may further include group pattern information with respect to transformation units of coefficients for each color component, single level pattern information and reverse pattern information having modified expression methods according to a density of the pattern information.

Whether to encode one of various pieces of pattern information such as the hierarchical coding unit pattern information, the group pattern information, the density pattern information, etc. may be determined according to the coded depth of the current coding unit, the encoding mode, etc. Pattern information type information indicating whether one of various pieces of pattern information has been encoded may be encoded.

FIG. 28 is a flowchart illustrating a video decoding method using pattern information of a hierarchical data unit, according to an exemplary embodiment.

In operation 2810, a bitstream of an encoded video is received and parsed.

In operation 2820, information regarding a maximum size of coding units, information regarding an encoding mode with respect to a coding unit of at least one coded depth for each maximum coding unit, and pattern information indicating whether texture related information for each maximum coding unit is encoded are extracted from the parsed bitstream. Furthermore, encoded video data for each maximum coding unit may be extracted from the parsed bitstream based on the information regarding the encoding mode and the pattern information.

In particular, whether to extract texture information of a transformation unit may be determined of every coding unit for each coded depth of maximum coding units by using maximum coding unit pattern information based on a hierarchical structure of the maximum coding units, the coding units, and the transformation units, hierarchical coding unit pattern information, and coding unit pattern information from among the pattern information. Pattern information with respect to transformation units of coefficients for each color component may be extracted based on group pattern information. An expression method of single level pattern information or reverse pattern information must be changed and read according to a density of the pattern information.

If transformation unit pattern information of a transformation depth 0 is 0, transformation index information with respect to the current transformation unit does not need to be parsed.

Whether the extracted pattern information is one of various pieces of pattern information such as the hierarchical coding unit pattern information, the group pattern information, the density pattern information, etc. may be determined according to a coded depth of the current coding unit, the encoding mode, etc. Pattern information type information indicating whether one of various pieces of pattern information has been encoded may be extracted, and pattern information of the current coding unit may be read based on the pattern information type information.

In operation 2830, video data encoded for each coding unit of at least one coded depth is decoded and restored based on the information regarding the encoding mode.

The video encoding and video decoding according to exemplary embodiments perform encoding and decoding of a large size data unit in order to perform image processing on large size video data. Thus, pattern information may not be dense with respect to a data unit of a wide plane region or a data unit of a picture that spatially does not have motion information. Furthermore, the pattern information may not be dense with respect to a picture having a complex pixel value. Therefore, a level applied to the pattern information is adjusted according to a density of pattern information of the picture, thereby increasing transmission efficiency of the pattern information.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Alternatively, the exemplary embodiments may be implemented as carrier waves or signals of a computer readable transmission medium for transmission over a network, such as the Internet.

As will be understood by the skilled artisan, the exemplary embodiments may be implemented as software or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A video decoding apparatus comprising:
   an extractor which extracts from a bitstream first pattern information indicating whether residual samples of a current coding unit are equal to 0, and when the first pattern information indicates the residual samples are not equal to 0, extracts from the bitstream transformation index information indicating whether a transformation unit of a current level included in the current coding unit is split;
   a decoder which splits the transformation unit of the current level into transformation units of a lower level when the transformation index information indicates a split of the transformation unit of the current level,
   wherein the extractor further extracts second pattern information for the transformation unit of the current level when the transformation index information indicates a non-split of the transformation unit of the current level,
   wherein the second pattern information indicates whether the transformation unit of the current level contains one or more transform coefficients not equal to 0.

2. The video decoding apparatus of claim 1, wherein the transformation unit of the current level is included in the coding unit, and a size of the transformation unit of the current level is smaller than or equal to a size of the coding unit.

3. The video decoding apparatus of claim 2, wherein the transformation unit of the current level is obtained by halving a height and a width of the coding unit.

4. The video decoding apparatus of claim 1, wherein the coding unit is a data unit in which a picture of the encoded video is encoded and the transformation unit of the current level is a data unit in which the data of the coding unit is transformed.

* * * * *